(12) United States Patent
Currivan et al.

(10) Patent No.: US 7,203,227 B1
(45) Date of Patent: Apr. 10, 2007

(54) ALL DIGITAL REFERENCE FREQUENCY LOCKING

(75) Inventors: Bruce J. Currivan, Irvine, CA (US); Ravi Bhaskaran, Irvine, CA (US); Thomas J. Kolze, Phoenix, AZ (US); Kevin Lee Miller, Lawrenceville, GA (US); Jeffrey S. Putnam, Irvine, CA (US); Fang Lu, Rowland Heights, CA (US); Tak K. Lee, Irvine, CA (US); Thuji S. Lin, Irvine, CA (US); Loke Kun Tan, Irvine, CA (US); Gopal Triplicane Venkatesan, Aliso Viejo, CA (US); Hsin-An Liu, Irvine, CA (US); Jonathan S. Min, Buena Park, CA (US); James P. Cavallo, Laguna Niguel, CA (US)

(73) Assignee: Broadcom Corporation, Irvine, CA (US)

(*) Notice: Subject to any disclaimer, the term of this patent is extended or adjusted under 35 U.S.C. 154(b) by 932 days.

(21) Appl. No.: 10/294,048

(22) Filed: Nov. 14, 2002

Related U.S. Application Data

(60) Provisional application No. 60/362,130, filed on Mar. 6, 2002.

(51) Int. Cl.
*H04B 1/38* (2006.01)
(52) U.S. Cl. .................................................... 375/222
(58) Field of Classification Search ................. 375/222, 375/219, 220, 354, 355, 356, 358, 371, 373, 375/374, 375, 376, 377; 370/324, 350, 395.62, 370/507; 702/89; 713/375, 400
See application file for complete search history.

(56) References Cited

U.S. PATENT DOCUMENTS

| 5,914,944 A | * | 6/1999 | Haugli et al. ............... 370/320 |
| 6,243,369 B1 | | 6/2001 | Grimwood et al. |
| 6,353,604 B2 | | 3/2002 | Grimwood et al. |
| 6,650,624 B1 | * | 11/2003 | Quigley et al. ............. 370/252 |

(Continued)

OTHER PUBLICATIONS

Bruce Currivan, Director, Modem Hardware Engineering, Broadcom Corporation, "Cable Modems: Current Technologies and Applications," 1999, Professional Education International, Inc., Part II: The Physical Layer, Cable Modem Physical Layer Specification and Design, ISBN 0-933217-53-6, pp. 79-112.

*Primary Examiner*—Khanh Tran
*Assistant Examiner*—Sam K. Ahn
(74) *Attorney, Agent, or Firm*—Garlick Harrison & Markison; Shayne X. Short

(57) ABSTRACT

All digital reference frequency locking. An all digital approach is provided for operation within one or more CMs within a cable modem communication system to lock the upstream of the one or more CMs to the downstream symbol clock provided from a CMTS. The locking of the CM's upstream may be performed using one of at least three different functions: (1) Locking the upstream symbol clock phase to the downstream symbol clock phase, (2) Locking the downstream symbol clock phase to the headend reference clock phase (typically 10.24 MHz or integer multiple thereof), and (3) Locking the upstream carrier frequency to the downstream symbol clock frequency. The all-digital techniques for supporting all digital reference frequency locking functionality provide high performance to support S-CDMA and other synchronous modulation techniques.

70 Claims, 27 Drawing Sheets synchronous Cable Modem (CM) Physical layer (PHY)

U.S. PATENT DOCUMENTS 6,664,827 B2 * 12/2003 O'Leary et al. ............ 327/156
2001/0033611 A1 * 10/2001 Grimwood et al. ......... 375/219
2001/0053180 A1 * 12/2001 Asia et al. .................. 375/222
2002/0131426 A1 * 9/2002 Amit et al. ................. 370/401

* cited by examiner satellite communication system

High Definition Television (HDTV) communication system uni-directional cellular communication system uni-directional cellular communication system bi-directional cellular communication system uni-directional microwave communication system bi-directional microwave communication system

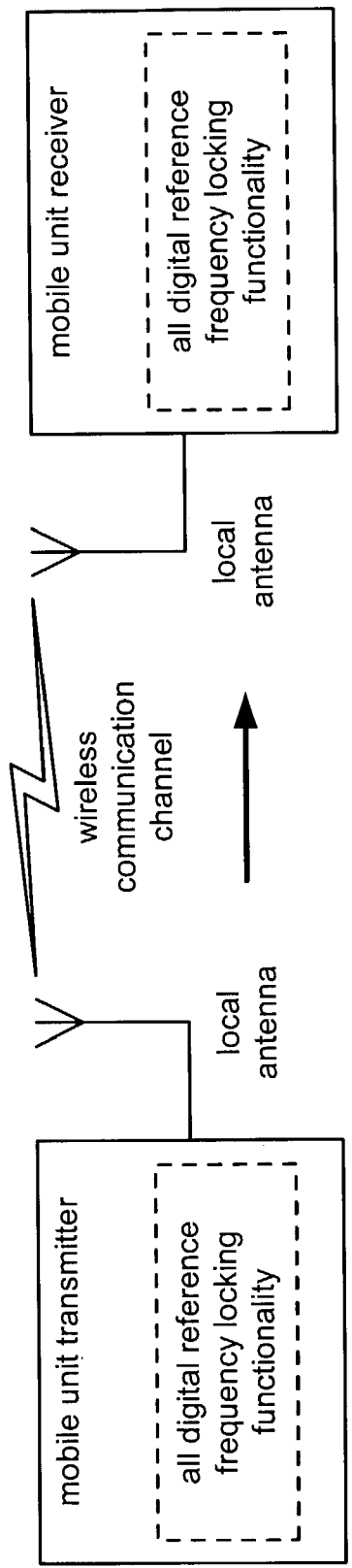
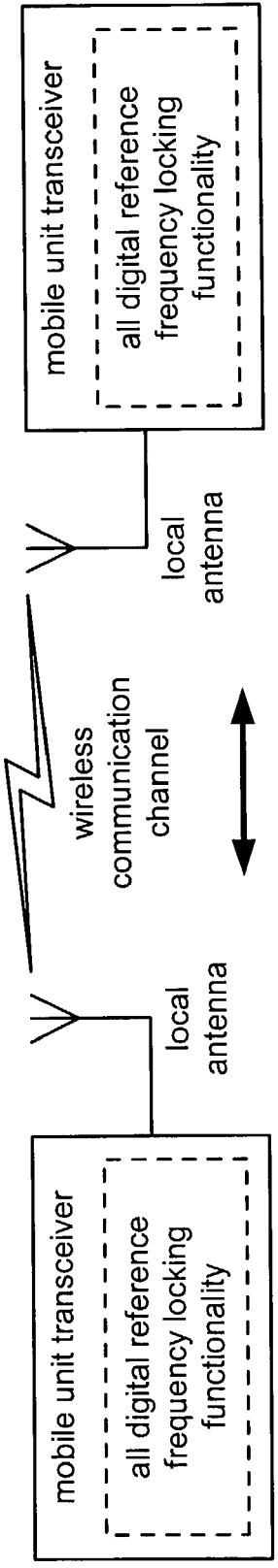
Fig. 7A — uni-directional point-to-point radio communication system
Fig. 7B — bi-directional point-to-point radio communication system Cable Modem Termination System (CMTS) system single chip DOCSIS/EuroDOCSIS Cable Modem (CM) system alternative single chip DOCSIS/EuroDOCSIS Cable Modem (CM) system Fig. 13 cable modem communication system 1300 phases and delta phases processing

Cable Modem (CM) synchronous timing approach (using counters for M, N)

CM Synchronous Timing Approach (Using 2 NCOs and Counters to Synchronize Clocks)

synchronous Cable Modem (CM) Physical layer (PHY)

upstream modulo-NCO (Numerically Controlled Oscillator) functionality

| Symbol Rate | Coarse μ Bits | $F_M$ | $16F_{BU}$ | $8F_{BU}$ | $4F_{BU}$ | $2F_{BU}$ | $F_{BU}$ |
|---|---|---|---|---|---|---|---|
| 5.12 | 2 | $F_o/16$ | $F_o/2$ | $F_o/4$ | $F_o/8$ | $F_o/16$ | $F_o/32$ |
| 2.56 | 3 | $F_o/16$ | $F_o/4$ | $F_o/8$ | $F_o/16$ | $F_o/32$ | $F_o/64$ |
| 1.28 | 4 | $F_o/16$ | $F_o/8$ | $F_o/16$ | $F_o/32$ | $F_o/64$ | $F_o/128$ |
| 0.64 | 5 | $F_o/16$ | $F_o/16$ | $F_o/32$ | $F_o/64$ | $F_o/128$ | $F_o/256$ |
| 0.32 | 6 | $F_o/16$ | $F_o/32$ | $F_o/64$ | $F_o/128$ | $F_o/256$ | $F_o/512$ |
| 0.16 | 7 | $F_o/16$ | $F_o/64$ | $F_o/128$ | $F_o/256$ | $F_o/512$ | $F_o/1024$ | upstream modulo-NCO (Numerically Controlled Oscillator) look up table

Fig. 22 upstream carrier lock functionality upstream interface signals symbol clock synchronization functionality (locking downstream symbol clock phase to headend reference clock phase)

all digital reference frequency locking method tracking options

ALL DIGITAL REFERENCE FREQUENCY LOCKING

CROSS REFERENCE TO RELATED PATENTS/PATENT APPLICATIONS

The present U.S. Utility Patent Application claims priority pursuant to 35 U.S.C. § 119(e) to the following U.S. Provisional Patent Applications which is hereby incorporated herein by reference in its entirety and made part of the present U.S. Utility Patent Application for all purposes:

1. U.S. Provisional Application Ser. No. 60/362,130, entitled "All digital method of locking a modem to a reference frequency," filed Mar. 6, 2002, pending.

BACKGROUND OF THE INVENTION

1. Technical Field of the Invention

The invention relates generally to communication systems; and, more particularly, it relates to synchronous communication systems.

2. Description of Related Art

Cable modem communication systems have been under continual development for the last several years. There has been development to try to provide for improvements in the manner in which communications between one or more Cable Modems (CMs) and a Cable Modem Termination System (CMTS) is performed. A focus of the development within these cable modem communication systems has been to improve the manner in which broadband network access to an ever increasing number of CMs within the cable modem communication system.

Cable modem communication systems are realized when a cable company offers network access, oftentimes the Internet, access over the cable that is provisioned to provide cable television services to a subscriber. This way, the Internet information can use the same cables because the cable modem communication system provides downstream data, sent using the CMTS from the Internet to an individual computer having CM functionality, into a communication channel having a 6 MHz capacity. The data provided in the reverse direction within the cable modem communication system is typically referred to as upstream data, namely, information that is sent from an individual (e.g., from a CM) back to the Internet via the CMTS. The transmission of upstream data typically requires even less of the cable's available bandwidth. Some estimates say only 2 MHz are required for the upstream data transmission; this is based on the assumption is that most people download far more information than they upload to/from the Internet.

Putting both upstream and downstream data on the cable television system requires two types of equipment: a CM on the customer end and the CMTS at the cable provider's end. Between these two types of equipment, all the computer networking, security and management of Internet access over cable television is put into place. This intervening region may be generically referred to as a CM network segment, and a variety of problems can occur to signals sent across this CM network segment.

One particular problem is the effects of multi-path. This multi-path degradation may be viewed as being an attenuated, shifted (delayed) replica of a signal that is transmitted within the cable that resides in the CM network segment. The multi-path degradation, along with other undesirable signal modifying effects, can significantly reduce the ability to maximize the full bandwidth potential of the cable modem communication system. This may result in slower service to subscribers that use CMs, which may lead these users to seek Internet access elsewhere. There is continually an ever-increasing desire to maximize the throughput of communication systems, and cable modem communication systems are no exception. The undesirable effects of multi-path, along with other interference generating effects within channel segments within the cable modem communication system, produce significantly degraded performance of the overall system.

Another significant problem may arise from the physical properties of the devices employed at the CM and CMTS. One such problem arises from the use of analog Voltage Controlled Oscillators (VCOs) within the CM and CMTS. In most prior art approaches, analog VCOs and voltage controlled crystal oscillators (VCXOs) are used to lock to a reference. The inherent analog implementation of the locking of the CM upstream to the downstream symbol clock of the CMTS, being implemented typically using phase locked loops (PLLs), introduces a number of deleterious effects. For example, the analog design may undesirably introduce a multitude of problems, including pickup of circuit board noise, lack of precise control of parameters, extra and increased parts cost, and other deficiencies as well. The inherent nature of these analog devices will introduce some noise into the system. In addition, the emitted frequency from these devices may vary over temperature, humidity, and other environmental variations.

A number of operational degradations may result when upstream and downstream transmissions are not properly synched. For example, in the presence of carrier frequency offset between the CM and the CMTS, a modulation's constellation may actually spin when trying to sample received information. In addition, when there is phase error in a received signal, then a modulation's constellation may be rotated by some degree. In the presence of gain error in a received signal, then the constellation points of a modulation may be further in and/or closer out that they should be based on the placement of points within the constellation. For at least these reasons, there is a need to ensure that the upstream and downstream transmissions are properly locked.

Moreover, within cable modem communication systems that operate using S-CDMA (Synchronous Code Division Multiple Access) modulation, the synchronous operation of the various elements within the cable modem communication system is imperative and required by the Data Over Cable Service Interface Specifications (DOCSIS), draft 2.0. Presently, there does not yet exist in the art a sufficient solution to ensure the synchronous operation of the various devices within the cable modem communication system as required by DOCSIS.

BRIEF SUMMARY OF THE INVENTION

Various aspects of the invention can be found in a cable modem communication system that is operable to support all digital reference frequency locking functionality between a CM's upstream and the downstream symbol clock. Aspects of the invention may be practiced in a variety of contexts including one or both of a transmitter and a receiver within the context of a communication system. In addition, the invention may be practiced within any one of a number of various embodiments. The invention is operable within the field of synchronous systems. From certain perspectives, it may be viewed as relating to synchronous communication systems that employ PLLs. The invention offers an all digital implementation of PLLs that may be achieved, in certain embodiments, by using fractional (M/N) PLLs.

An all digital approach is provided for operation within one or more CMs within a cable modem communication system to lock the upstream of the one or more CMs to the downstream symbol clock provided from a CMTS. The invention provides a solution to the problem posed by the draft DOCSIS 2.0 data-over-cable specification of how to perform various locking functions. The invention also provides an all digital solution to the locking of the CM's upstream using one of at least three different functions: (1) Locking the upstream symbol clock phase to the downstream symbol clock phase, (2) Locking the downstream symbol clock phase to the headend reference clock phase (e.g., typically 10.24 MHz), and/or (3) Locking the upstream carrier frequency to the downstream symbol clock frequency. The all-digital techniques for supporting all digital reference frequency locking functionality provide high performance to support S-CDMA and other synchronous modulation techniques.

The invention provides a highly integrated digital solution with a lower parts count when compared to prior art analog approaches, a solution that introduces much less deleterious printed circuit board noise that may undesirably be coupled into other circuits within the device and/or system, and the invention also provides a much cleaner upstream due to the freeze/unfreeze method and system operation provided according to the invention. A much greater control of overall performance is provided by the all digital implementation of the invention. The direct translation implementation, using the all digital approach, does not require an analog PLL at all. The many advantages offered by this novel approach include little or no acquisition time, no stability issues, no damping factor to set, and/or no loop bandwidth to set, among other benefits provided by the invention.

In addition, other aspects, advantages and novel features of the invention will become apparent from the following detailed description of the invention when considered in conjunction with the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

FIG. 7A is a system diagram illustrating embodiment of a uni-directional point-to-point radio communication system that is built according to the invention.

FIG. 7B is a system diagram illustrating embodiment of a bi-directional point-to-point radio communication system that is built according to the invention.

FIG. 22 is a diagram illustrating an embodiment of an upstream modulo-Numerically Controlled Oscillator (NCO) look up table according to the invention.

DETAILED DESCRIPTION OF THE INVENTION

FIGS. 1, 2, 3, 4, 5A, 5B, 5C, 6A, 6B, 7A, 7B, 8A, 8B, 8C, 9, 10, 11, and 12 illustrate a number of communication system context embodiments where various aspects of the invention may be implemented.

Figure 1:
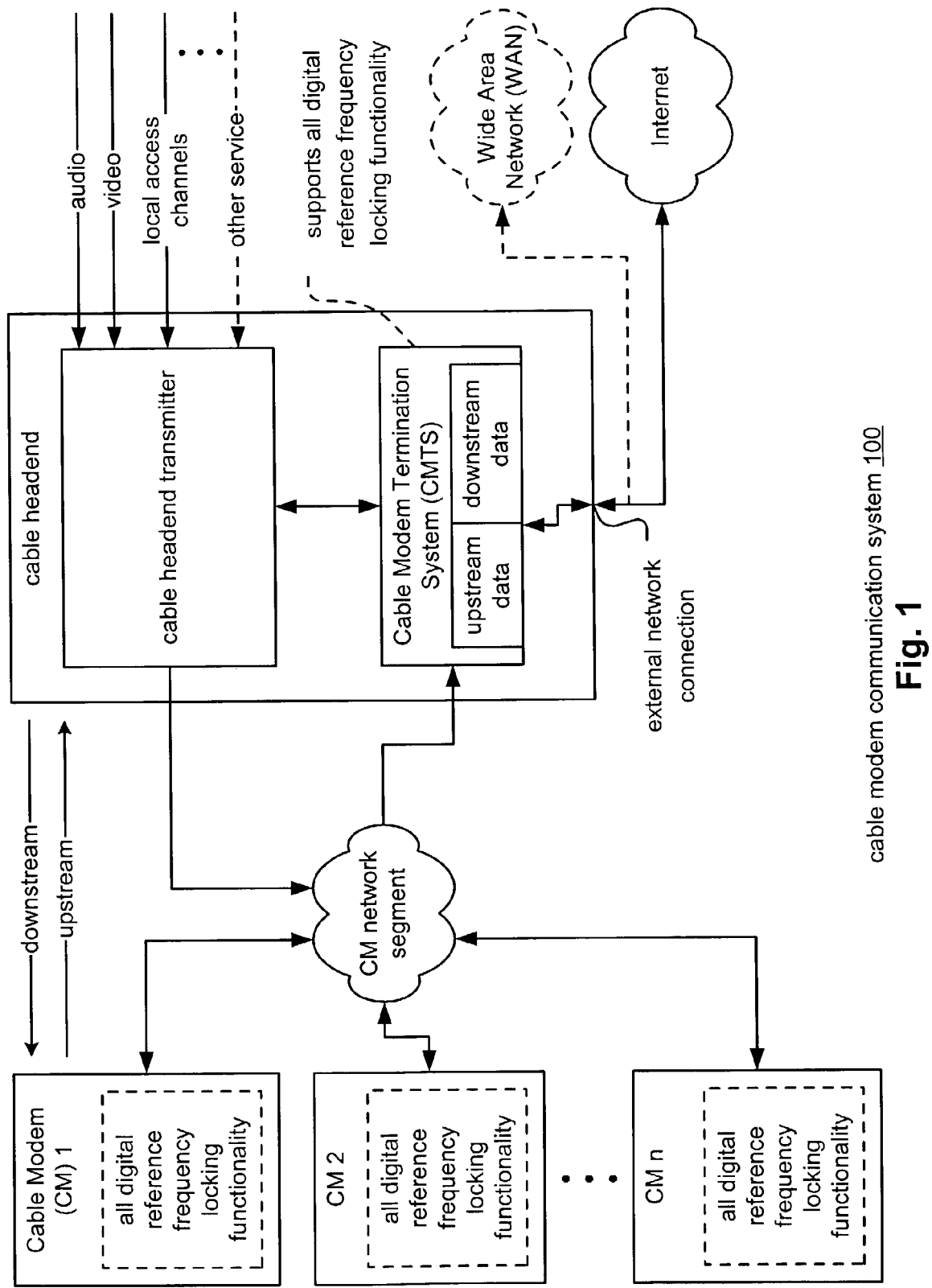
FIG. 1 is a system diagram illustrating an embodiment of a cable modem communication system that is built according to the invention.

FIG. 1 is a system diagram illustrating an embodiment of a cable modem communication system 100 that is built according to the invention. The cable modem communication system 100 includes a number of Cable Modems (CMs) that may be used by different users (the CMs shown as a CM 1, a CM 2, ..., and a CM n) and a cable headend that includes a Cable Modem Termination System (CMTS) and a cable headend transmitter. The CMTS is a component that exchanges digital signals with CMs on a cable network.

Each of the CMs (shown as CM 1, CM 2, ..., and CM n) is operable to communicatively couple to a Cable Modem (CM) network segment. A number of elements may be included within the CM network segment. For example, routers, splitters, couplers, relays, and amplifiers may be contained within the CM network segment without departing from the scope and spirit of the invention.

The CM network segment allows communicative coupling between any one of the CMs and a cable headend that includes the cable modem headend transmitter and the CMTS. The CMTS may be located at a local office of a cable television company or at another location within a cable modem communication system. The cable headend transmitter is able to provide a number of services including those of audio, video, local access channels, as well as any other service known in the art of cable systems. Each of these services may be provided to the one or more CMs (shown as a CM 1, CM 2, ..., and CM n).

In addition, through the CMTS, the CMs are able to transmit and receive data from the Internet and/or any other network to which the CMTS is communicatively coupled via an external network connection. The operation of a CMTS, at the cable-provider's head-end, may be viewed as providing analogous functions that are provided by a digital subscriber line access multiplexor (DSLAM) within a digital subscriber line (DSL) system. The CMTS takes the traffic coming in from a group of customers on a single channel and routes it to an Internet Service Provider (ISP) for connection to the Internet, as shown via the external network connection that communicatively couples to the Internet access. At the cable headend, the cable providers will have space, or lease space for a third-party ISP to have, servers for accounting and logging, dynamic host configuration protocol (DHCP) for assigning and administering the Internet protocol (IP) addresses of all the cable system's users (specifically, for the CM 1, CM 2, ..., and CM n), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (Euro-DOCSIS), the major standard used by European cable systems in providing Internet access to users, without departing from the scope and spirit of the invention.

The downstream information flows to any one or more of the connected CMs (shown as the CM 1, CM 2, ..., and CM n). The individual network connection, within the CM network segment, decides whether a particular block of data is intended for that particular CM or not. On the upstream side, information is sent from the CMs (shown as the CM 1, CM 2, ... and CM n) to the CMTS; on this upstream transmission, the CMs (shown as the CM 1, CM 2, ..., and CM n) to which the data is not intended do not see that data at all.

As an example of the capabilities provided by a CMTS, the CMTS will enable as many as 1,000 users to connect to the Internet through a single 6 MHz channel. Since a single channel is capable of 30–40 Mbps (mega-bits per second) of total throughput, this means that users may see far better performance than is available with standard dial-up modems (operating over telephone lines) that may be used to access external networks such as the Internet. Some embodiments implementing the invention are described below and in the various Figures that show the data handling and control within one or both of a CM and a CMTS within a CM system that operates by employing CDMA (Code Division Multiple Access) and/or S-CDMA (Synchronous Code Division Multiple Access).

The CMs (shown as the CM 1, CM 2, ..., and CM n) and the CMTS communicate synchronization information to one another to ensure proper alignment of transmission from the CMs to the CMTS. This is where the synchronization of the S-CDMA communication systems is extremely important. When a number of the CMs all transmit their signals at a same time such that these signals are received at the CMTS on the same frequency and at the same time, they must all be able to be properly de-spread and decoded for proper signal processing. In order to support this synchronous operation, the need for locking the upstream of the CMs to the downstream symbol clock received from the CMTS is of utmost importance.

Each of the CMs (shown as the CM 1, CM 2, ..., and CM n) is located a respective transmit distance from the CMTS. In order to achieve optimum spreading diversity and orthogonality for the CMs (shown as the CM 1, CM 2, ..., and CM n) when transmitting to the CMTS, each of the CM transmissions must be synchronized so that it arrives, from the perspective of the CMTS, synchronous with other CM transmissions. In order to achieve this goal, for a particular transmission cycle, each of the CMs typically transmits to the CMTS at a respective transmission time, which will likely differ from the transmission times of other CMs. These differing transmission times will be based upon the relative transmission distance between the CM and the CMTS. These operations may be supported by the determination of the round trip delays (RTPs) between the CMTS and each supported CM. With these RTPs determined, the CMs may then determine at what point to transmit their S-CDMA data so that all CM transmissions will arrive synchronously at the CMTS.

The invention provides that any of the CMs is operable to support all digital reference frequency locking functionality. The invention provides that an all digital approach is able to lock a CM's upstream to the downstream symbol clock. The use of all digital components in performing this function will provide for much improved performance over the prior art approach of using analog components.

The invention enables one or more CMs to perform locking of the upstream onto the downstream symbol clock provided by the CMTS. Moreover, the CMTS, operating cooperatively with the cable headend transmitter, may also be operable to support all digital reference frequency locking functionality according to the invention. Both ends of the cable modem communication system 100 (the CM end and the CMTS/cable headend transmitter end) may benefit from the invention in performing improved, more efficient, reference frequency locking using all digital techniques.

The FIG. 1 shows just one embodiment where the various aspects of the invention may be implemented. Several other embodiments are described and envisioned within the scope and spirit of the invention as well.

Figure 2:
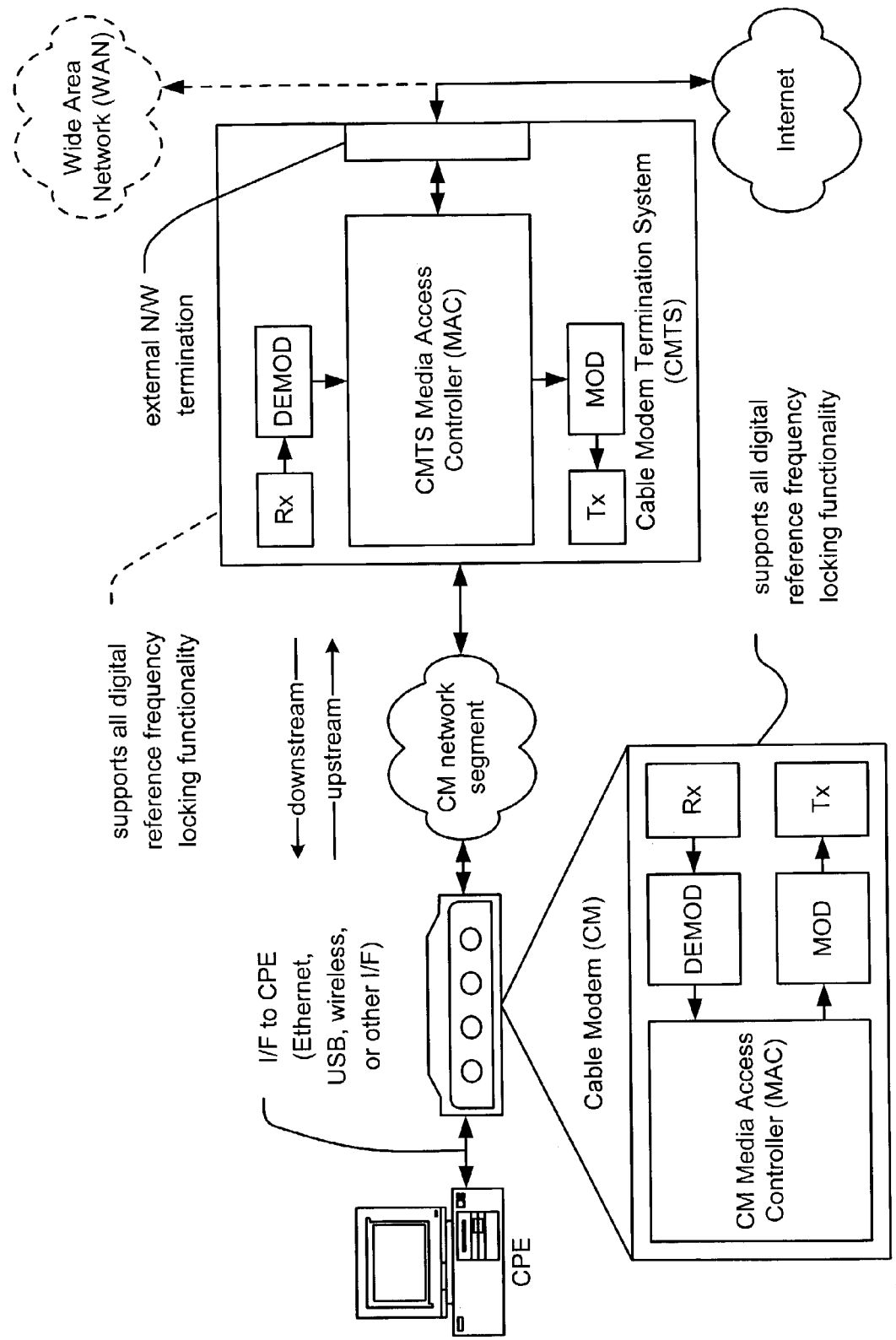
FIG. 2 is a system diagram illustrating another embodiment of a cable modem communication system that is built according to the invention.

FIG. 2 is a system diagram illustrating another embodiment of a cable modem communication system 200 that is built according to the invention. From certain perspectives, the FIG. 2 may be viewed as a communication system allowing bi-directional communication between a customer premise equipment (CPE) and a network. In some embodiments, the CPE is a personal computer or some other device allowing a user to access an external network. The Cable Modem (CM) and the CPE may be communicatively coupled via a number of possible means, including an Ethernet interface, a USB (Universal Serial Bus) interface, a wireless interface, and/or some other interface. The external network may be the Internet itself, or, alternatively some other type of wide area network (WAN). For example, the CM communication system 200 is operable to allow Internet protocol (IP) traffic to achieve transparent bi-directional transfer between a CMTS-network side interface (CMTS-NSI: viewed as being between the CMTS and the Internet) and a CM to CPE interface (CMCI: viewed as being between the Cable Modem (CM) and the CPE).

The Internet, and/or the WAN, is/are communicatively coupled to the CMTS via the CMTS-NSI. The CMTS is operable to support the external network termination, for one or both of the WAN and the Internet. The CMTS includes a modulator and a demodulator to support transmitter and receiver functionality to and from a CM network segment. The receiver of the CMTS is operable to support all digital reference frequency locking functionality according to the invention. In addition, the CM includes a modulator and a demodulator to support transmitter and receiver functionality to and from a CM network segment. A CM Media Access Controller (MAC) in interposed between the modulator and a demodulator of the CM.

The CM is also operable to support all digital reference frequency locking functionality according to the invention. That is to say, the upstream carrier frequency of the CM may be locked to the downstream symbol clock frequency of a signal received by the CM. The invention enables the CM to ensure that it performs a very high precision and accurate locking of the downstream reference frequency using all digital techniques.

Therefore, within the CM, the upstream timing, derived from the downstream symbol clock, is performed in such a way as to introduce virtually no jitter and also in a manner that is relatively inexpensive, efficient, and straightforward in terms of implementation borrowing on its all digital approach. The upstream symbol clock phase may be locked to a downstream symbol clock phase. The various benefits of the invention may also be provided within the CMTS as well.

A number of elements may be included within the CM network segment. For example, routers, splitters, couplers, relays, and amplifiers may be contained within the CM network segment without departing from the scope and spirit of the invention. The CM network segment allows communicative coupling between a CM user and the CMTS.

The FIG. 1 and the FIG. 2 show just two embodiments where the various aspects of the invention may be implemented. Several other embodiments are described as well.

Figure 3:
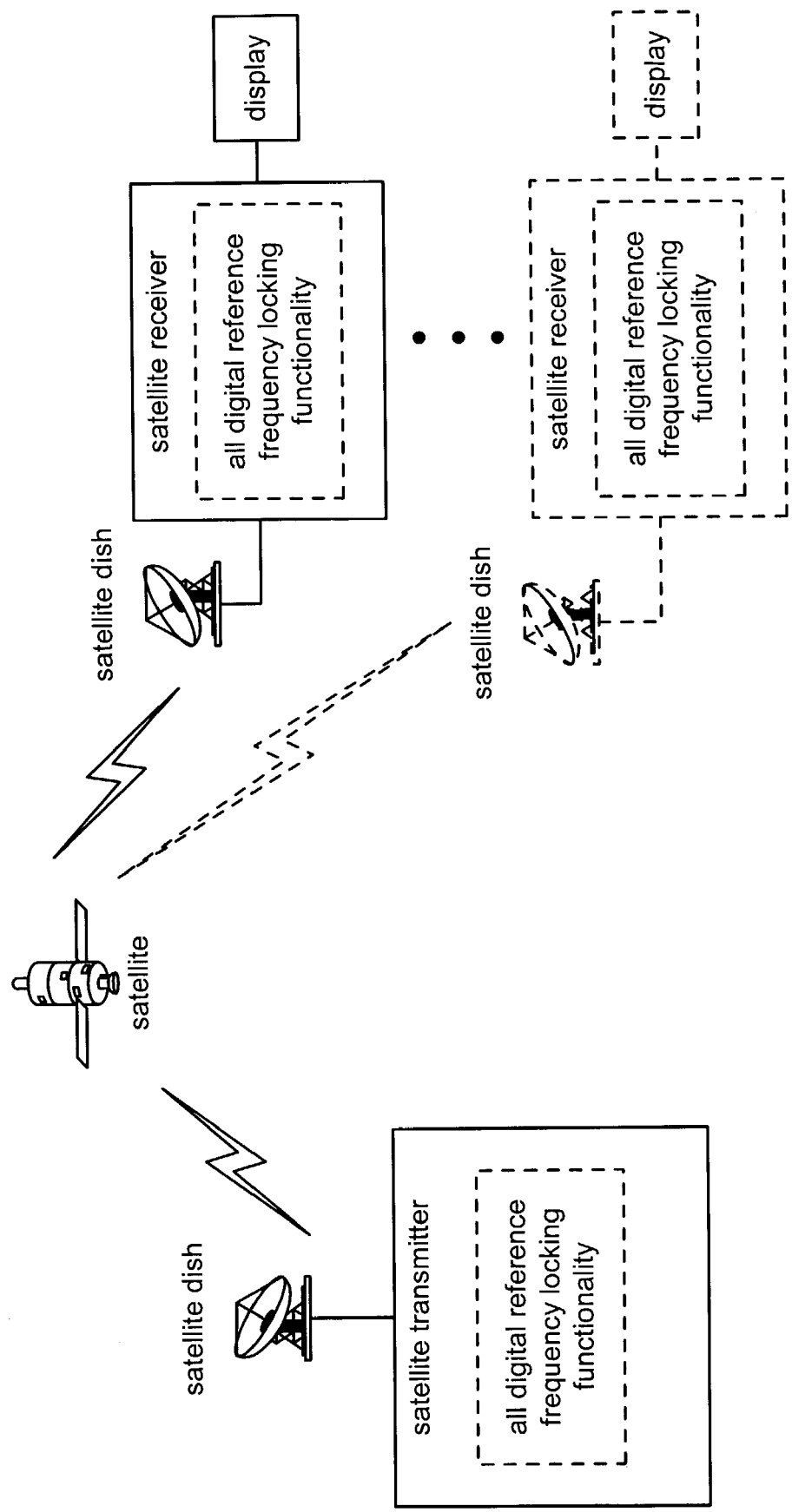
FIG. 3 is a system diagram illustrating an embodiment of a satellite communication system that is built according to the invention.

FIG. 3 is a system diagram illustrating an embodiment of a satellite communication system that is built according to the invention. A satellite transmitter is communicatively coupled to a satellite dish that is operable to communicate with a satellite. The satellite transmitter may also be communicatively coupled to a wired network. This wired network may include any number of networks including the Internet, proprietary networks, and/or other wired networks. The satellite transmitter employs the satellite dish to communicate to the satellite via a wireless communication channel. The satellite is able to communicate with one or more satellite receivers, shown as satellite receivers (each having a satellite dish). Each of the satellite receivers may also be communicatively coupled to a display.

Here, the communication to and from the satellite may cooperatively be viewed as being a wireless communication channel, or each of the communication to and from the satellite may be viewed as being two distinct wireless communication channels.

For example, the wireless communication "channel" may be viewed as not including multiple wireless hops in one embodiment. In other embodiments, the satellite receives a signal received from the satellite transmitter (via its satellite dish), amplifies it, and relays it to satellite receiver (via its satellite dish); the satellite receiver may also be implemented using terrestrial receivers such as satellite receivers, satellite based telephones, and/or satellite based Internet receivers, among other receiver types. In the case where the satellite receives a signal received from the satellite transmitter (via its satellite dish), amplifies it, and relays it, the satellite may be viewed as being a "transponder." In addition, other satellites may exist that perform both receiver and transmitter operations in cooperation with the satellite. In this case, each leg of an up-down transmission via the wireless communication channel would be considered separately.

In whichever embodiment, the satellite communicates with the satellite receiver. The satellite receiver may be viewed as being a mobile unit in certain embodiments (employing a local antenna); alternatively, the satellite receiver may be viewed as being a satellite earth station that may be communicatively coupled to a wired network in a similar manner in which the satellite transmitter may also be communicatively coupled to a wired network.

Each of the satellite transmitter and the satellite receivers is operable to support all digital reference frequency locking functionality according to the invention. For example, each of the receivers is operable to perform locking of a transmit clock frequency to a receive clock frequency (from the satellite), using all digital reference frequency locking functionality. In addition, the satellite transmitter is operable to lock a transmitted symbol clock phase to the reference clock phase of a local oscillator within the satellite transmitter.

It is noted here, and is also applicable within many of the other embodiments as well, the all digital reference frequency locking functionality may be implemented as a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

In certain embodiments, the all digital reference frequency locking functionality may employ a memory that may be implemented as a single memory device or a plurality of memory devices. Such a memory device may be a read-only memory, random access memory, volatile memory, non-volatile memory, static memory, dynamic memory, flash memory, and/or any device that stores digital information.

It is also noted that the all digital reference frequency locking functionality may implement one or more of its functions via a state machine, digital circuitry, and/or logic circuitry. In addition, any memory storing the corresponding operational instructions to support the all digital reference frequency locking functionality may be embedded with the circuitry comprising the state machine, digital circuitry, and/or logic circuitry.

Figure 4:
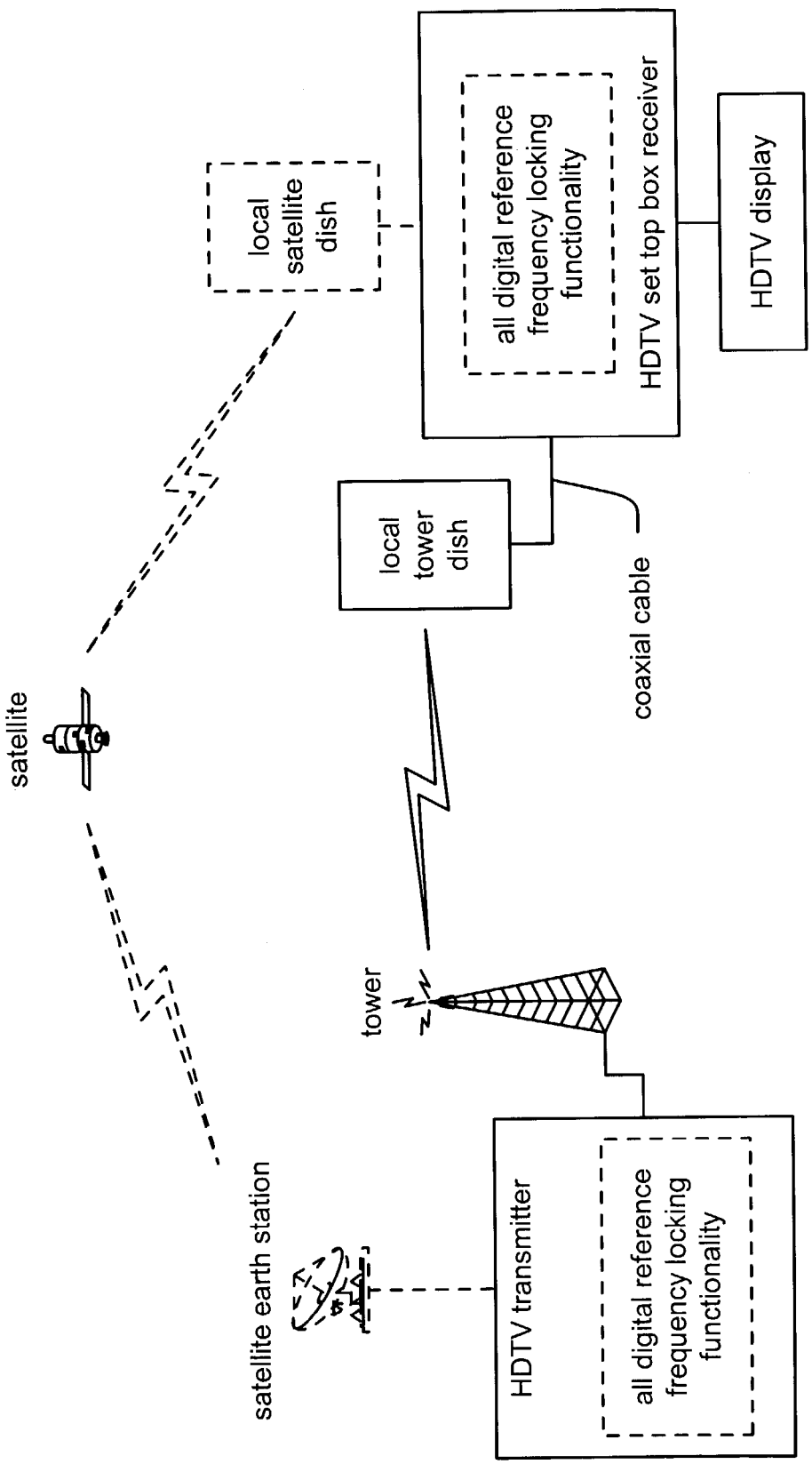
FIG. 4 is a system diagram illustrating an embodiment of a High Definition Television (HDTV) communication system that is built according to the invention.

FIG. 4 is a system diagram illustrating an embodiment of a High Definition Television (HDTV) communication system that is built according to the invention. An HDTV transmitter is communicatively coupled to a tower. The HDTV transmitter, using its tower, transmits a signal to a local tower dish via a wireless communication channel. The local tower dish communicatively couples to an HDTV set top box receiver via a coaxial cable. The HDTV set top box receiver includes the functionality to receive the wireless transmitted signal that has been received by the local tower dish; this may include any transformation and/or down-converting as well to accommodate any up-converting that may have been performed before and during transmission of the signal from the HDTV transmitter and its tower.

The HDTV set top box receiver is also communicatively coupled to an HDTV display that is able to display the demodulated and decoded wireless transmitted signals received by the HDTV set top box receiver and its local tower dish. The HDTV transmitter (via its tower) transmits a signal directly to the local tower dish via the wireless communication channel in this embodiment. In alternative embodiments, the HDTV transmitter may first receive a signal from a satellite, using a satellite earth station that is communicatively coupled to the HDTV transmitter, and then transmit this received signal to the to the local tower dish via the wireless communication channel. In this situation, the HDTV transmitter operates as a relaying element to transfer a signal originally provided by the satellite that is destined for the HDTV set top box receiver. For example, another satellite earth station may first transmit a signal to the satellite from another location, and the satellite may relay this signal to the satellite earth station that is communicatively coupled to the HDTV transmitter. The HDTV transmitter performs receiver functionality and then transmits its received signal to the local tower dish.

In even other embodiments, the HDTV transmitter employs its satellite earth station to communicate to the satellite via a wireless communication channel. The satellite is able to communicate with a local satellite dish; the local satellite dish communicatively couples to the HDTV set top box receiver via a coaxial cable. This path of transmission shows yet another communication path where the HDTV set top box receiver may communicate with the HDTV transmitter.

In whichever embodiment and whichever signal path the HDTV transmitter employs to communicate with the HDTV set top box receiver, the HDTV set top box receiver is operable to receive communication transmissions from the HDTV transmitter.

Each of the HDTV transmitter and the HDTV set top box receiver is operable to support all digital reference frequency locking functionality according to the invention. For example, the HDTV set top box receiver is operable to perform locking of a transmit clock frequency to a receive clock frequency, using all digital reference frequency locking functionality. In addition, the HDTV transmitter is operable to lock a transmitted symbol clock phase to the reference clock phase of a local oscillator within the HDTV transmitter.

Figure 5A:
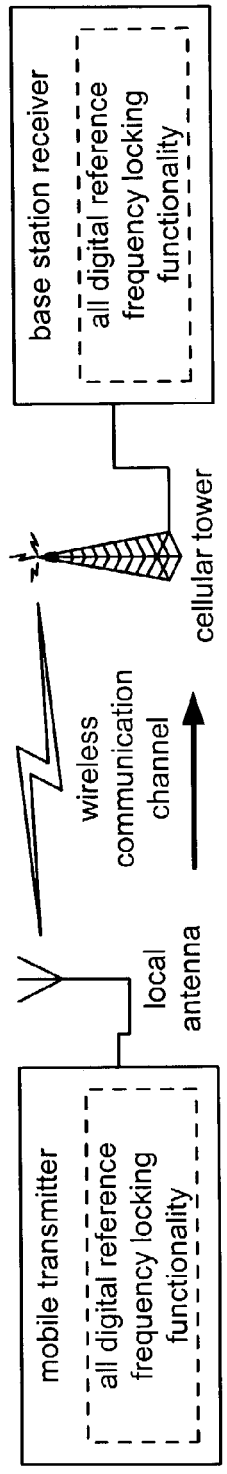
FIG. 5A and FIG. 5B are system diagrams illustrating embodiment of uni-directional cellular communication systems that are built according to the invention.
Figure 5B:
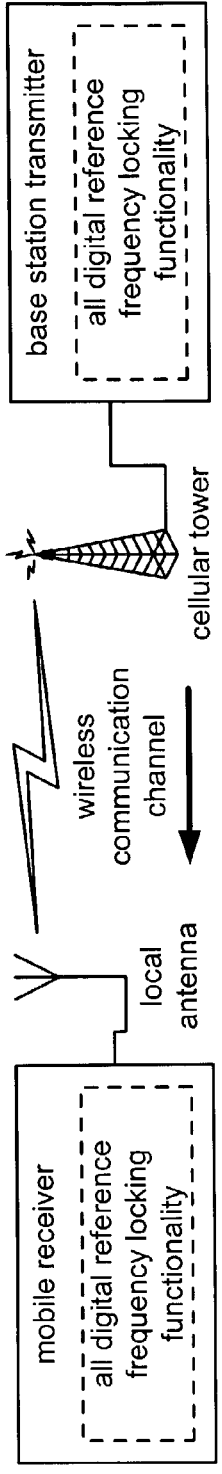

FIG. 5A and FIG. 5B are system diagrams illustrating embodiments of uni-directional cellular communication systems that are built according to the invention.

Referring to the FIG. 5A, a mobile transmitter includes a local antenna communicatively coupled thereto. The mobile transmitter may be any number of types of transmitters including a one way cellular telephone, a wireless pager unit, a mobile computer having transmit functionality, or any other type of mobile transmitter. The mobile transmitter transmits a signal, using its local antenna, to a cellular tower via a wireless communication channel. The cellular tower is communicatively coupled to a base station receiver; the receiving tower is operable to receive data transmission from the local antenna of the mobile transmitter that has been communicated via the wireless communication channel. The cellular tower communicatively couples the received signal to the base station receiver.

Each of the mobile transmitter and the base station receiver is operable to support all digital reference frequency locking functionality according to the invention. For example, the base station receiver is operable to perform locking of a transmit clock frequency to a receive clock frequency, using all digital reference frequency locking functionality. In addition, the mobile transmitter is operable to lock a transmitted symbol clock phase to the reference clock phase of a local oscillator within the mobile transmitter.

The FIG. 5A shows a uni-directional cellular communication system where the communication goes from the mobile transmitter to the base station receiver via the wireless communication channel.

Referring to the FIG. 5B, a base station transmitter includes a cellular tower communicatively coupled thereto. The base station transmitter, using its cellular tower, transmits a signal to a mobile receiver via a communication channel. The mobile receiver may be any number of types of receivers including a one-way cellular telephone, a wireless pager unit, a mobile computer having receiver functionality, or any other type of mobile receiver. The mobile receiver is communicatively coupled to a local antenna; the local antenna is operable to receive data transmission from the cellular tower of the base station transmitter that has been communicated via the wireless communication channel. The local antenna communicatively couples the received signal to the mobile receiver.

Each of the base station transmitter and the mobile receiver is operable to support all digital reference frequency locking functionality according to the invention. For example, the mobile receiver is operable to perform locking of a transmit clock frequency to a receive clock frequency, using all digital reference frequency locking functionality. In addition, the base station transmitter is operable to lock a transmitted symbol clock phase to the reference clock phase of a local oscillator within the base station transmitter.

The FIG. 5B shows a uni-directional cellular communication system where the communication goes from the base station transmitter to the mobile receiver via the wireless communication channel.

Figure 5C:
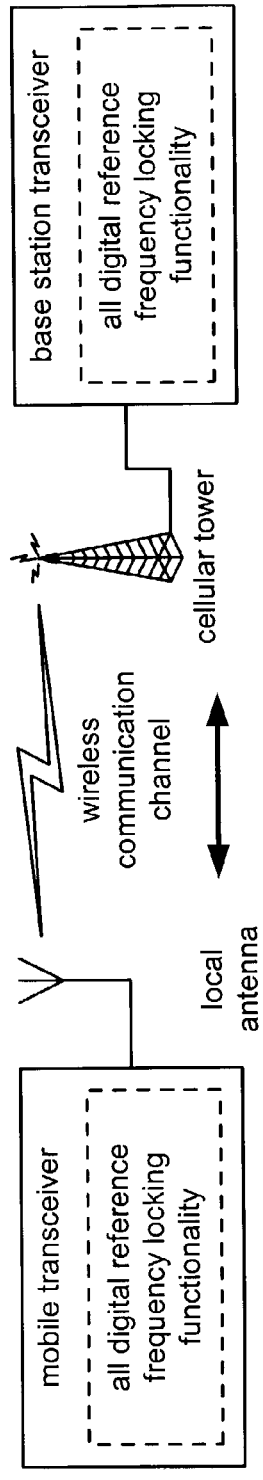
FIG. 5C is a system diagram illustrating embodiment of a bi-directional cellular communication system that is built according to the invention.

The FIG. 5C shows a bi-directional cellular communication system where the communication can go to and from the base station transceiver and to and from the mobile transceiver via the wireless communication channel.

Referring to the FIG. 5C, a base station transceiver includes a cellular tower communicatively coupled thereto. The base station transceiver, using its cellular tower, transmits a signal to a mobile transceiver via a communication channel. The reverse communication operation may also be performed. The mobile transceiver is able to transmit a signal to the base station transceiver as well. The mobile transceiver may be any number of types of transceiver including a cellular telephone, a wireless pager unit, a mobile computer having transceiver functionality, or any other type of mobile transceiver. The mobile transceiver is communicatively coupled to a local antenna; the local antenna is operable to receive data transmission from the cellular tower of the base station transceiver that has been communicated via the wireless communication channel. The local antenna communicatively couples the received signal to the mobile transceiver.

The base station transceiver is operable to support all digital reference frequency locking functionality according to the invention. For example, the base station transceiver is operable to perform locking of a transmit clock frequency to a receive clock frequency, using all digital reference frequency locking functionality. In addition, the base station transceiver is operable to lock a transmitted symbol clock phase to the reference clock phase of a local oscillator within the base station transceiver transmitter.

Similarly, the mobile transceiver is operable to support all digital reference frequency locking functionality according to the invention. For example, the mobile transceiver is operable to perform locking of a transmit clock frequency to a receive clock frequency, using all digital reference frequency locking functionality. In addition, each mobile transceiver is operable to lock a transmitted symbol clock phase to the reference clock phase of a local oscillator within the respective mobile transceiver.

The FIG. 5A, the FIG. 5B, and the FIG. 5C show yet more embodiments where all digital reference frequency locking functionality is supported at the receiver/transceiver capable end (or ends) of a communication system.

Figure 6A:
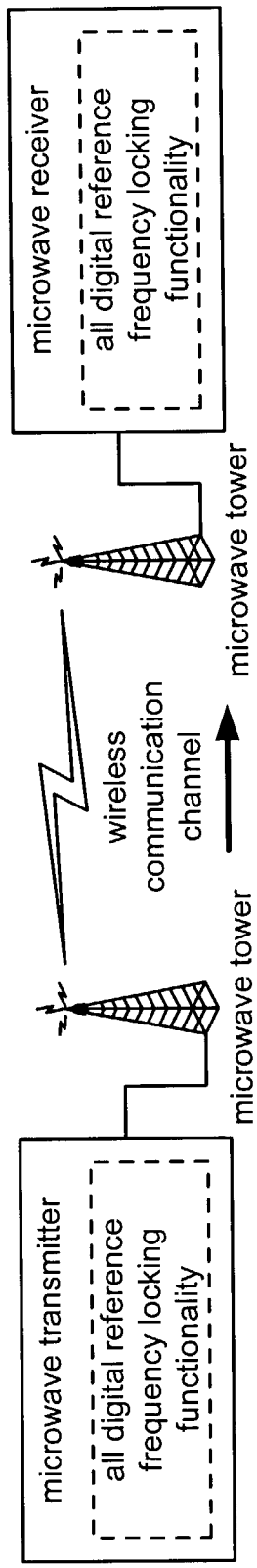
FIG. 6A is a system diagram illustrating embodiment of a uni-directional microwave communication system that is built according to the invention.

FIG. 6A is a system diagram illustrating embodiment of a uni-directional microwave communication system that is built according to the invention. A microwave transmitter is communicatively coupled to a microwave tower. The microwave transmitter, using its microwave tower, transmits a signal to a microwave tower via a wireless communication channel. A microwave receiver is communicatively coupled to the microwave tower. The microwave tower is able to receive transmissions from the microwave tower that have been communicated via the wireless communication channel.

Each of the microwave transmitter and the microwave receiver is operable to support all digital reference frequency locking functionality according to the invention. For example, the microwave receiver is operable to perform locking of a transmit clock frequency to a receive clock frequency, using all digital reference frequency locking functionality. In addition, the microwave transmitter is operable to lock a transmitted symbol clock phase to the reference clock phase of a local oscillator within the microwave transmitter.

Figure 6B:
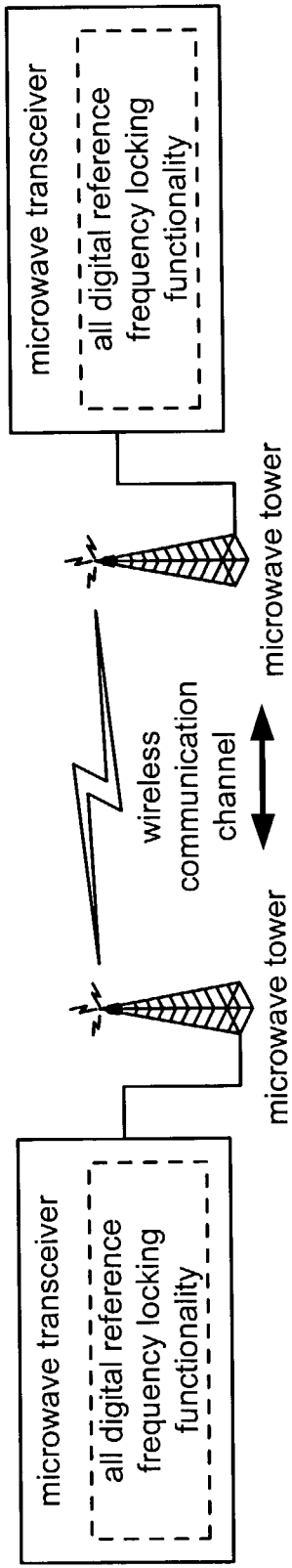
FIG. 6B is a system diagram illustrating embodiment of a bi-directional microwave communication system that is built according to the invention.

FIG. 6B is a system diagram illustrating embodiment a of bi-directional microwave communication system that is built according to the invention. Within the FIG. 6B, a first microwave transceiver is communicatively coupled to a first microwave tower. The first microwave transceiver, using the first microwave tower (the first microwave transceiver's microwave tower), transmits a signal to a second microwave tower of a second microwave transceiver via a wireless communication channel. The second microwave transceiver is communicatively coupled to the second microwave tower (the second microwave transceiver's microwave tower). The second microwave tower is able to receive transmissions from the first microwave tower that have been communicated via the wireless communication channel. The reverse communication operation may also be performed using the first and second microwave transceivers.

Each of the microwave transceivers is operable to support all digital reference frequency locking functionality according to the invention. For example, each of the microwave transceivers is operable to perform locking of a transmit clock frequency to a receive clock frequency, using all digital reference frequency locking functionality. In addition, each of the microwave transceivers is operable to lock a transmitted symbol clock phase to the reference clock phase of a local oscillator within the respective microwave transceiver.

The FIG. 6A and the FIG. 6B show yet more embodiments where all digital reference frequency locking functionality is supported at the receiver/transceiver capable end (or ends) of a communication system.

FIG. 7A is a system diagram illustrating embodiment of a uni-directional point-to-point radio communication system that is built according to the invention. A mobile unit transmitter includes a local antenna communicatively coupled thereto. The mobile unit transmitter, using its local antenna, transmits a signal to a local antenna of a mobile unit receiver via a wireless communication channel.

Each of the mobile unit transmitter and the mobile unit receiver is operable to support all digital reference frequency locking functionality according to the invention. For example, the mobile unit receiver is operable to perform locking of a transmit clock frequency to a receive clock frequency, using all digital reference frequency locking functionality. In addition, the mobile unit transmitter is operable to lock a transmitted symbol clock phase to the reference clock phase of a local oscillator within the mobile unit transmitter.

FIG. 7B is a system diagram illustrating embodiment of a bi-directional point-to-point radio communication system that is built according to the invention. Within the FIG. 7B, a first mobile unit transceiver is communicatively coupled to a first local antenna. The first mobile unit transceiver, using the first local antenna (the first mobile unit transceiver's local antenna), transmits a signal to a second local antenna of a second mobile unit transceiver via a wireless communication channel. The second mobile unit transceiver is communicatively coupled to the second local antenna (the second mobile unit transceiver's local antenna). The second local antenna is able to receive transmissions from the first local antenna that have been communicated via the wireless communication channel. The reverse communication operation may also be performed using the first and second mobile unit transceivers.

Each of the mobile unit transceivers is operable to support all digital reference frequency locking functionality according to the invention. For example, each of the mobile unit transceivers is operable to perform locking of a transmit clock frequency to a receive clock frequency, using all digital reference frequency locking functionality. In addition, each of the mobile unit transceivers is operable to lock a transmitted symbol clock phase to the reference clock phase of a local oscillator within the respective mobile unit transceiver.

The FIG. 7A and the FIG. 7B show yet more embodiments where all digital reference frequency locking functionality is supported at the receiver/transceiver capable end (or ends) of a communication system.

Figure 8A:
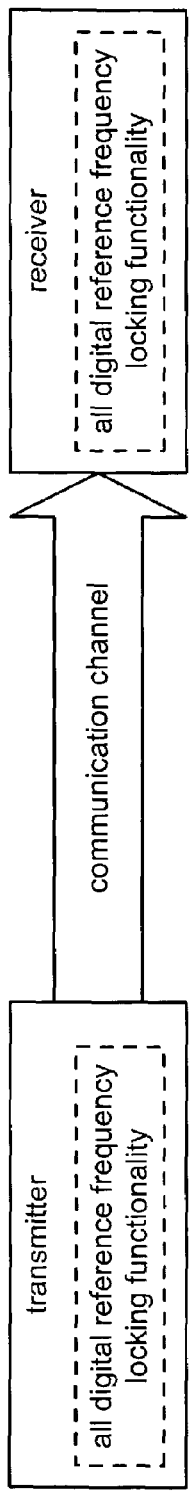
FIG. 8A is a system diagram illustrating embodiment of a uni-directional communication system that is built according to the invention.

FIG. 8A is a system diagram illustrating embodiment of a uni-directional communication system that is built according to the invention. A transmitter communicates to a receiver via a uni-directional communication channel. The uni-directional communication channel may be a wireline (or wired) communication channel or a wireless communication channel without departing from the scope and spirit of the invention. The wired media by which the uni-directional communication channel may be implemented are varied, including coaxial cable, fiber-optic cabling, and copper cabling, among other types of "wiring." Similarly, the wireless manners in which the uni-directional communication channel may be implemented are varied, including satellite communication, cellular communication, microwave communication, and radio communication, among other types of wireless communication.

Each of the transmitter and the receiver is operable to support all digital reference frequency locking functionality according to the invention. For example, the receiver is operable to perform locking of a transmit clock frequency to a receive clock frequency, using all digital reference frequency locking functionality. In addition, the transmitter is operable to lock a transmitted symbol clock phase to the reference clock phase of a local oscillator within the transmitter.

Figure 8B:
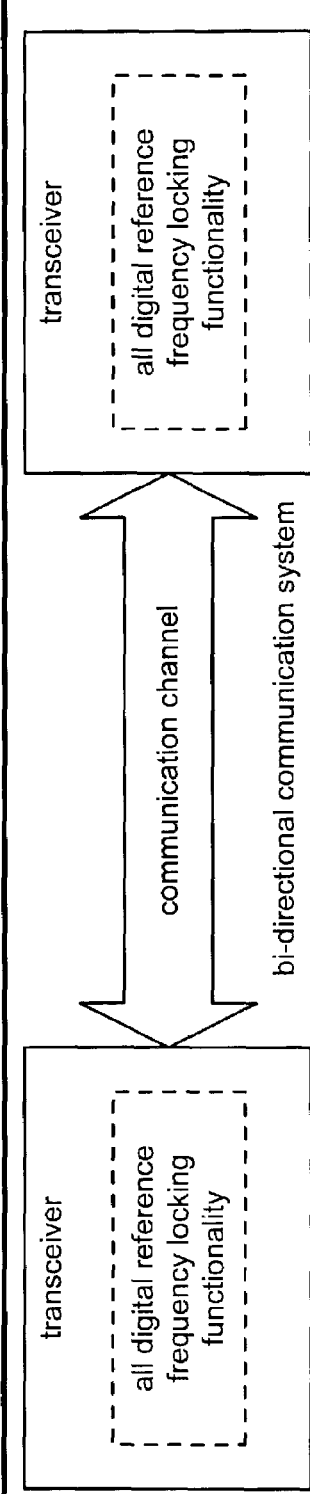
FIG. 8B is a system diagram illustrating embodiment of a bi-directional communication system that is built according to the invention.

FIG. 8B is a system diagram illustrating embodiment of a bi-directional communication system that is built according to the invention. Within the FIG. 8B, a first transceiver is communicatively coupled to a second transmitter via a bi-directional communication channel. The bi-directional communication channel may be a wireline (or wired) communication channel or a wireless communication channel without departing from the scope and spirit of the invention. The wired media by which the bi-directional communication channel may be implemented are varied, including coaxial cable, fiber-optic cabling, and copper cabling, among other types of "wiring." Similarly, the wireless manners in which the bi-directional communication channel may be implemented are varied, including satellite communication, cellular communication, microwave communication, and radio communication, among other types of wireless communication.

Each of the transceivers is operable to support all digital reference frequency locking functionality according to the invention. For example, each of the transceivers is operable to perform locking of a transmit clock frequency to a receive clock frequency, using all digital reference frequency locking functionality. In addition, each of the transceivers is operable to lock a transmitted symbol clock phase to the reference clock phase of a local oscillator within the respective transceiver.

Figure 8C:
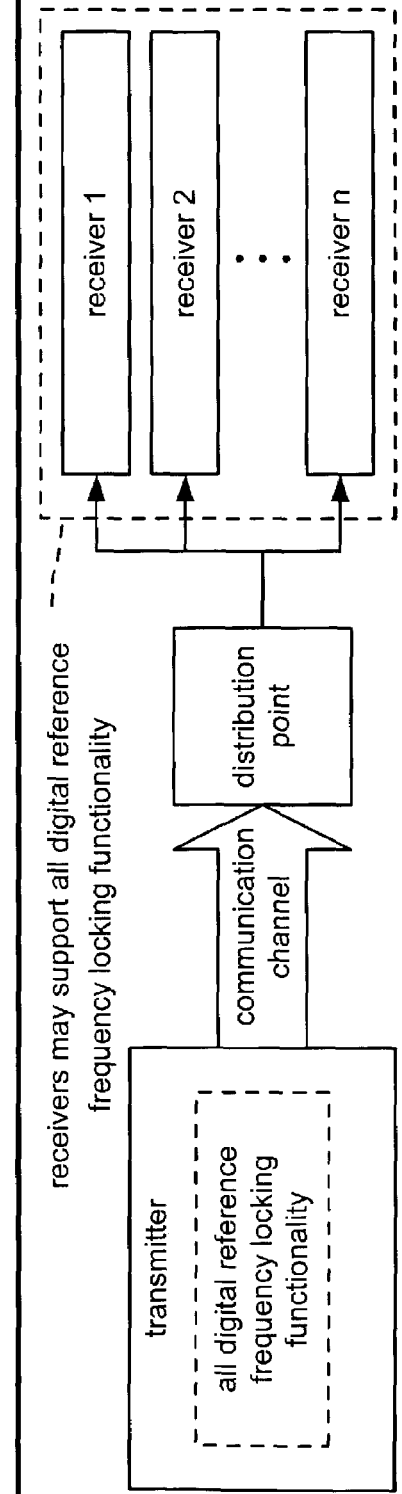
FIG. 8C is a system diagram illustrating embodiment of a one to many communication system that is built according to the invention.

FIG. 8C is a system diagram illustrating embodiment of a one to many communication system that is built according to the invention. A transmitter is able to communicate, via broadcast in certain embodiments, with a number of receivers, shown as receivers 1, 2, . . . , n via a uni-directional communication channel. The uni-directional communication channel may be a wireline (or wired) communication channel or a wireless communication channel without departing from the scope and spirit of the invention. The wired media by which the bi-directional communication channel may be implemented are varied, including coaxial cable, fiber-optic cabling, and copper cabling, among other types of "wiring." Similarly, the wireless manners in which the bi-directional communication channel may be implemented are varied, including satellite communication, cellular communication, microwave communication, and radio communication, among other types of wireless communication.

A distribution point is employed within the one to many communication system to provide the appropriate communication to the receivers 1, 2, . . . , and n. In certain embodiments, the receivers 1, 2, . . . , and n each receive the same communication and individually discern which portion of the total communication is intended for themselves.

In certain embodiments, each of the transmitter and the receivers is operable to support all digital reference frequency locking functionality according to the invention. For example, each of the receivers is operable to perform locking of a transmit clock frequency to a receive clock frequency, using all digital reference frequency locking functionality. In addition, the transmitter is operable to lock a transmitted symbol clock phase to the reference clock phase of a local oscillator within the transmitter.

The FIG. 8A, the FIG. 8B, and the FIG. 8C show yet more embodiments where all digital reference frequency locking functionality is supported at the receiver/transceiver capable end (or ends) of a communication system.

Figure 9:
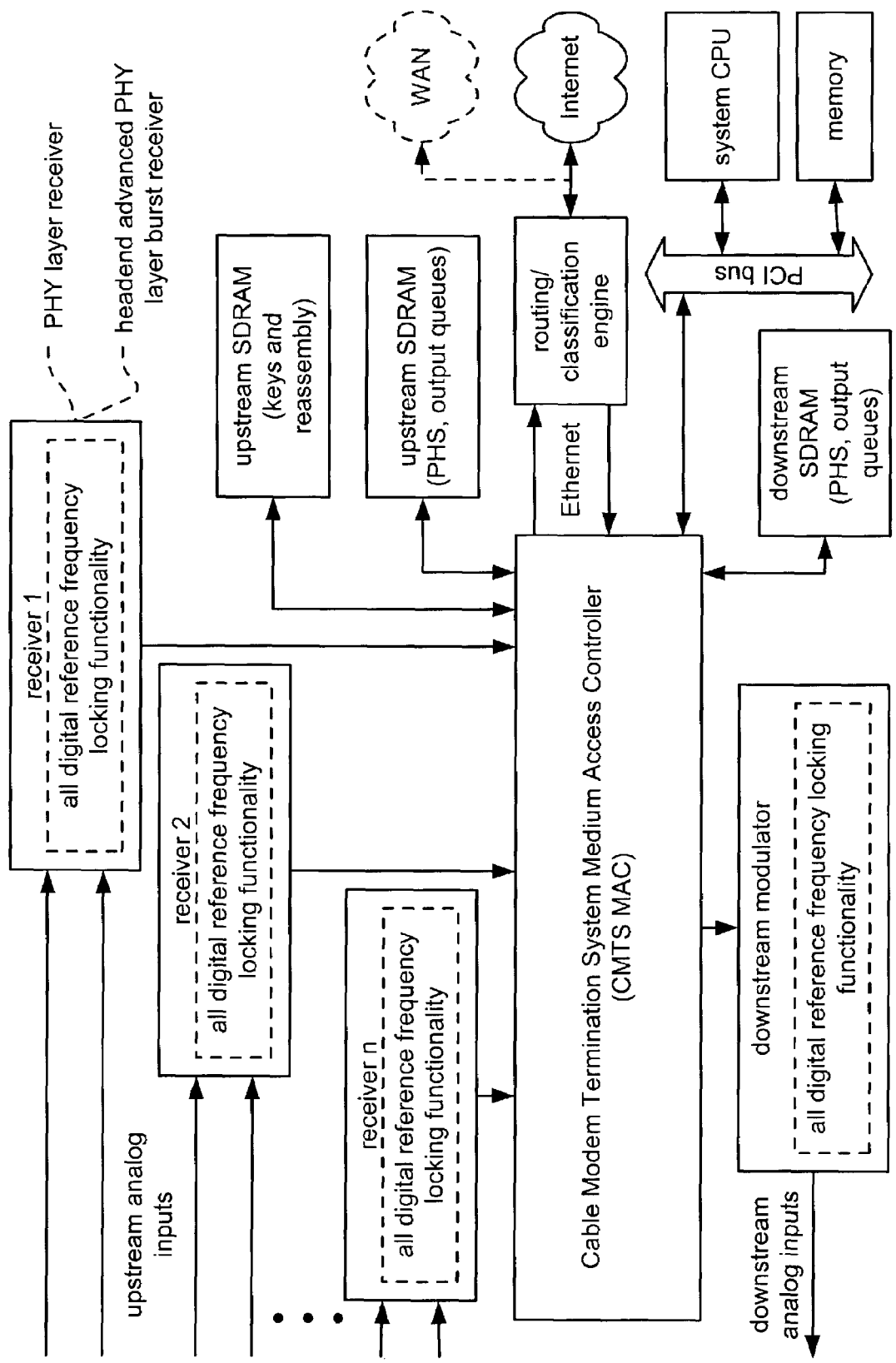
FIG. 9 is a system diagram illustrating an embodiment of a Cable Modem Termination System (CMTS) system that is built according to the invention.

FIG. 9 is a system diagram illustrating an embodiment of a Cable Modem Termination System (CMTS) system that is built according to the invention. The CMTS system includes a CMTS Medium Access Controller (MAC) that operates with a number of other devices to perform communication from one or more CMs to a WAN.

The CMTS MAC may be viewed as providing the hardware support for MAC-layer per-packet functions including fragmentation, concatenation, and payload header suppression that all are able to offload the processing required by a system central processing unit (CPU). This will provide for higher overall system performance. In addition, the CMTS MAC is able to provide support for carrier class redundancy via timestamp synchronization across a number of receivers, shown as a receiver 1, receiver 2, . . . , and a receiver n. Each receiver is operable to receive upstream analog inputs. In certain embodiments, each of the receivers 1, 2, . . . , and n is a dual universal advanced TDMA/CDMA (Time Division Multiple Access/Code Division Multiple Access) PHY-layer burst receiver. That is to say, each of the receivers 1, 2, . . . , and n includes at least one TDMA receive channel and at least one CDMA receive channel; in this case, each of the receivers 1, 2, . . . , and n may be viewed as being multi-channel receivers. In other embodiments, the receivers 1, 2, . . . , and n includes only CDMA receive channels.

In certain embodiments, each of the receivers 1, 2, . . . , and n is operable to support all digital reference frequency locking functionality according to the invention. For example, each of the receivers is operable to perform locking of a transmit clock frequency to a receive clock frequency, using all digital reference frequency locking functionality.

In addition, the CMTS MAC may be operated remotely with a routing/classification engine that is located externally to the CMTS MAC for distributed CMTS applications including mini fiber node applications. Moreover, a Standard Programming Interface (SPI) master port may be employed to control the interface to the receivers 1, 2, ..., and n as well as to a downstream modulator.

The CMTS MAC may be viewed as being a highly integrated CMTS MAC integrated circuit (IC) for use within the various DOCSIS and advanced TDMA/CDMA physical layer (PHY-layer) CMTS products. The CMTS MAC employs sophisticated hardware engines for upstream and downstream paths. The upstream processor design is segmented and uses two banks of Synchronous Dynamic Random Access Memory (SDRAM) to minimize latency on internal buses. The two banks of SDRAM used by the upstream processor are shown as upstream SDRAM (operable to support keys and reassembly) and SDRAM (operable to support Packaging, Handling, and Storage (PHS) and output queues). The upstream processor performs Data Encryption Standard (DES) decryption, fragment reassembly, de-concatenation, payload packet expansion, packet acceleration, upstream Management Information Base (MIB) statistic gathering, and priority queuing for the resultant packets. Each output queue can be independently configured to output packets to either a Personal Computer Interface (PCI) or a Gigabit Media Independent Interface (GMII). DOCSIS MAC management messages and bandwidth requests are extracted and queued separately from data packets so that they are readily available to the system controller.

The downstream processor accepts packets from priority queues and performs payload header suppression, DOCSIS header creation, DES encryption, Cyclic Redundancy Check (CRC) and Header Check Sequence (of the DOCSIS specification), Moving Pictures Experts Group (MPEG) encapsulation and multiplexing, and timestamp generation on the in-band data. The CMTS MAC includes an out-of-band generator and CDMA PHY-layer (and/or TDMA PHY-layer) interface so that it may communicate with a CM device's out-of-band receiver for control of power management functions. The downstream processor will also use SDRAM (operable to support PHS and output queues). The CMTS MAC may be configured and managed externally via a PCI interface and a PCI bus.

The FIG. 9 shows yet another embodiment where all digital reference frequency locking functionality may sometimes be supported at the receiver capable end of the communication channel, specifically at the CMTS end of a cable modem communication system.

Figure 10:
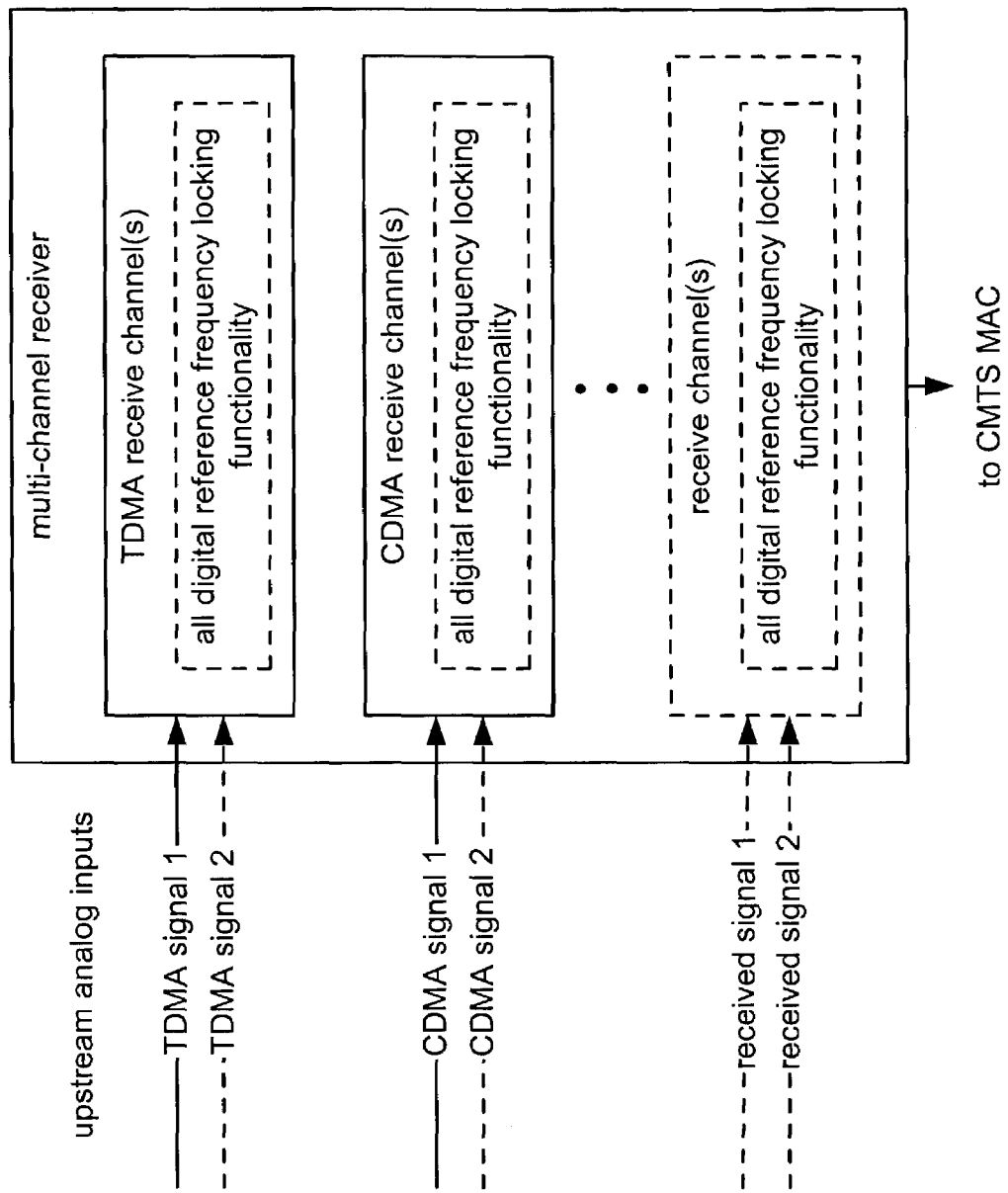
FIG. 10 is a system diagram illustrating an embodiment of a burst receiver system that is built according to the invention.

FIG. 10 is a system diagram illustrating an embodiment of a burst receiver system that is built according to the invention. The burst receiver system includes at least one multi-channel receiver. The multi-channel receiver is operable to receive a number of upstream analog inputs that are transmitted from CMs. The upstream analog inputs may be in the form of either TDMA (Time Division Multiple Access) and/or CDMA (Code Division Multiple Access) format. A number of receive channels may be included within the multi-channel receiver.

For example, the multi-channel receiver is operable to support a number of TDMA receive channels (shown as receiving a TDMA signal 1 and a TDMA signal 2). Each of the TDMA receive channels is operable to support all digital reference frequency locking functionality for any received TDMA signal. In addition, the multi-channel receiver is operable to support a number of CDMA receive channels (shown as receiving a CDMA signal 1 and a CDMA signal 2). Each of the CDMA receive channels is operable to support all digital reference frequency locking functionality for any received CDMA signal.

The multi-channel receiver is operable to interface with a CMTS MAC. It is understood that the burst receiver system may include a number of multi-channel receivers that are each operable to interface with the CMTS MAC.

In certain embodiments, the multi-channel receiver provides a number of various functionalities. The multi-channel receiver may be a universal headend advanced TDMA PHY-layer QPSK/QAM (Quadrature Phase Shift Keying/Quadrature Amplitude Modulation) burst receiver; the multi-channel receiver also include functionality to be a universal headend advanced CDMA PHY-layer QPSK/QAM burst receiver; and/or the multi-channel receiver also include functionality to be a universal headend advanced TDMA/CDMA PHY-layer QPSK/QAM burst receiver offering both TDMA/CDMA functionality. The multi-channel receiver may be DOCSIS/EuroDOCSIS based, IEEE 802.14 compliant. The multi-channel receiver may be adaptable to numerous programmable demodulation including BPSK (Binary Phase Shift Keying), and/or QPSK (Quadrature Phase Shift Keying), 8/16/32/64/128/256/516/1024 QAM (Quadrature Amplitude Modulation). The multi-channel receiver is adaptable to support variable symbols rates as well. Other functionality may also be included to the multi-channel receiver without departing from the scope and spirit of the invention.

Figure 11:
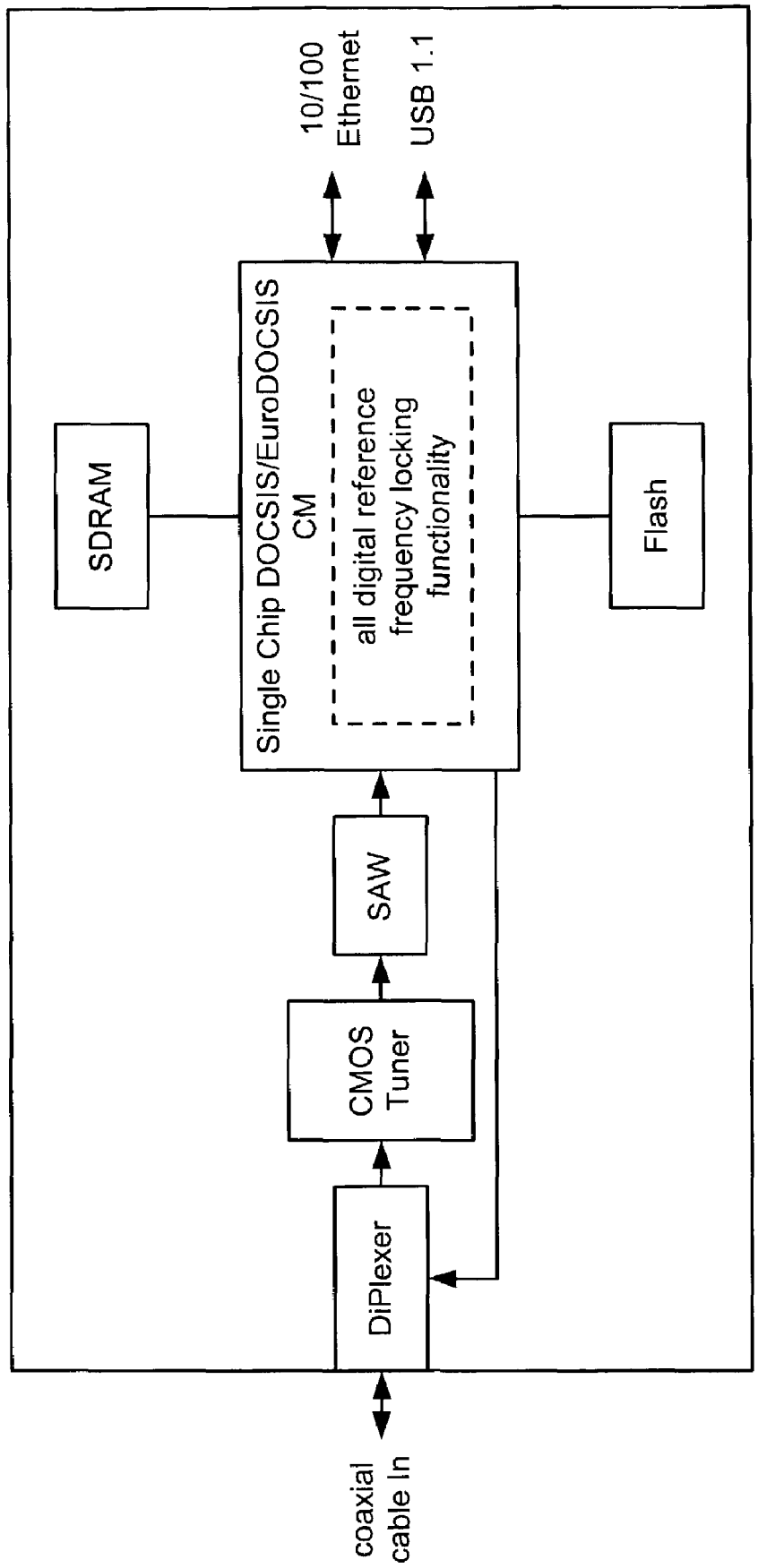
FIG. 11 is a system diagram illustrating an embodiment of a single chip DOCSIS/EuroDOCSIS Cable Modem (CM) system that is built according to the invention.

FIG. 11 is a system diagram illustrating an embodiment of a single chip DOCSIS/EuroDOCSIS Cable Modem (CM) system that is built according to the invention. The single chip DOCSIS/EuroDOCSIS CM system includes a single chip DOCSIS/EuroDOCSIS CM that is implemented in a very high level of integration and offering a very high level of performance. The single chip DOCSIS/EuroDOCSIS CM is operable to support all digital reference frequency locking functionality. A coaxial cable is input to a DiPlexer to provide CM access to the single chip DOCSIS/EuroDOCSIS CM system. The DiPlexer communicatively couples to a CMOS (Complementary Metal Oxide Semiconductor) tuner. The CMOS tuner may be implemented with a companion part that includes a low noise amplifier (LNA) and performs radio frequency (RF) automatic gain control (AGC). This two part solution is operable to support 64 and 256 QAM, in one embodiment. These two parts operate cooperatively with the single chip DOCSIS/EuroDOCSIS CM. The CMOS tuner may be operable to support an intermediate frequency (IF) output frequency range of 36–44 MHz (Mega-Hertz), and specifically support the 36.125 and 43.75 MHz center frequencies for the Phase Alteration Line (PAL) and National Television System Committee [or sometimes referred to as "Never Twice Same Color"] (NTSC) standards. Also, the CMOS tuner and the LNA (Low Noise Amplifier) and RF AGC (Radio Frequency Automatic Gain Controller) are DOCSIS and EuroDOCSIS standard supportable.

However, it is also noted that the CMOS tuner is operable to perform direct RF to baseband (BB) frequency transformation without requiring the IF transformation. The received signal from the DiPlexer is provided to the CMOS tuner. An external bandpass SAW (Surface Acoustic Wave) filter removes the channels distant from the desired signal.

The output from the SAW filter is then passed to the single chip DOCSIS/EuroDOCSIS CM. The single chip DOCSIS/EuroDOCSIS CM is supported by Synchronous Dynamic Random Access Memory (SDRAM) and Flash memory as well. In addition, the single chip DOCSIS/EuroDOCSIS CM supports both Ethernet and USB interfacing to any other devices that may exist within the single chip DOCSIS/EuroDOCSIS CM system.

Figure 12:
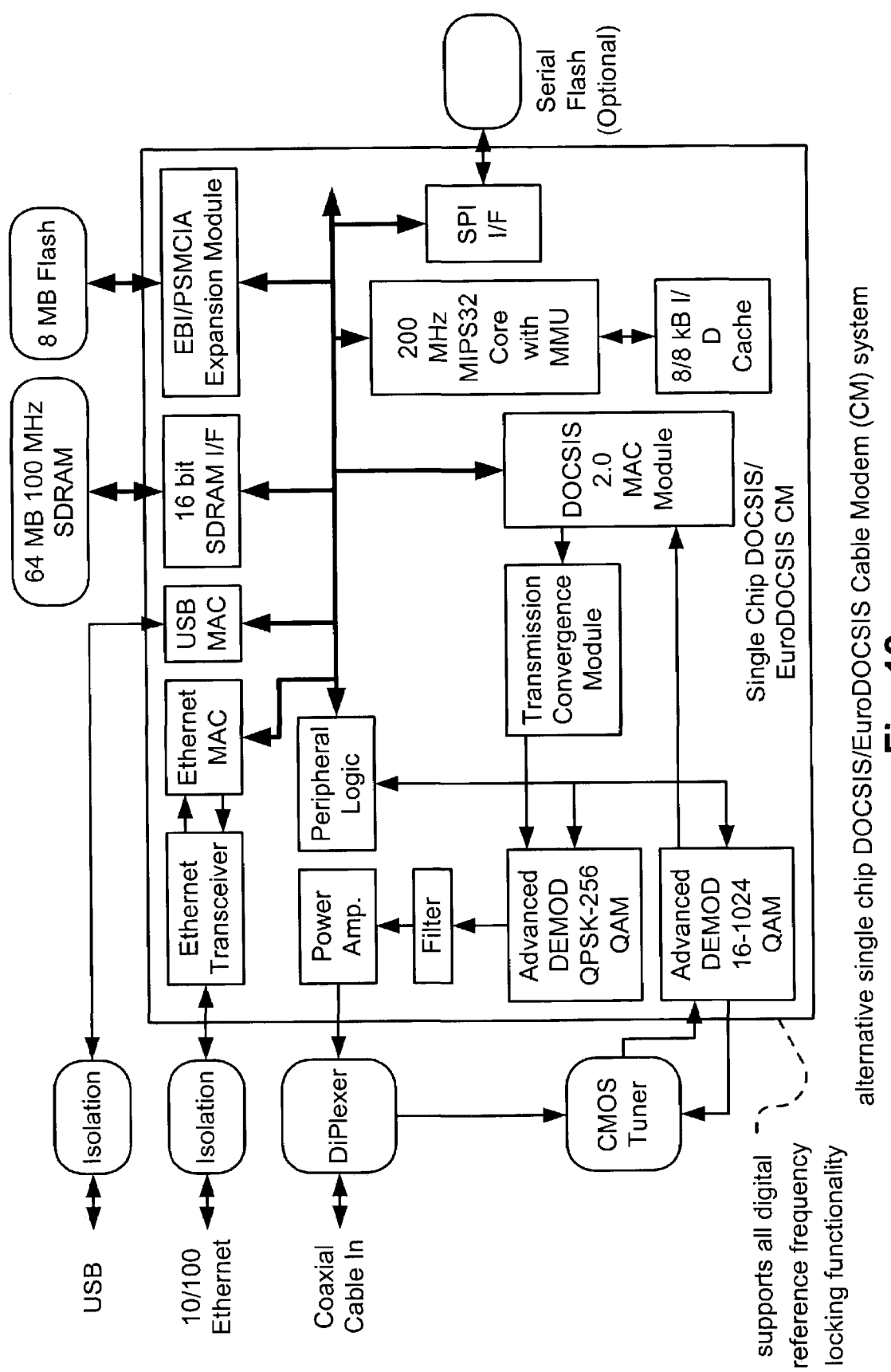
FIG. 12 is a system diagram illustrating another embodiment of a single chip DOCSIS/EuroDOCSIS Cable Modem (CM) system that is built according to the invention.

FIG. 12 is a system diagram illustrating another embodiment of a single chip DOCSIS/EuroDOCSIS Cable Modem (CM) system that is built according to the invention. this embodiment of a single chip DOCSIS/EuroDOCSIS CM system includes a single chip DOCSIS/EuroDOCSIS CM that combines an RF receiver with an advanced QAM demodulator, an advanced QAM and S-CDMA modulator/transmitter, a complete DOCSIS 2.0 Media Access Controller (MAC), a 200 MHz MIPS32 Communication Processor, a 16 bit, 100 MHz SDRAM interface, 10/100 Ethernet MAC with integrated transceiver and Media Independent Interface (MII), as well as a USB 1.1 (Universal Serial Bus 1.1) controller with integrated transceiver.

The QAM receiver directly samples a tuner output (such as the CMOS tuner of the other embodiment described above) with an 11 bit analog to digital converter (ADC) and input AGC amplifier. The receiver digitally re-samples and demodulates the signal with recovered clock and carrier timing, filters and equalizes the data, and passes soft decisions to an ITU-T J.83 Annex A/B/C compatible decoder. The receiver supports variable symbol rate 4/16/32/64/128/256/1024 QAM FEC (Forward Error Correction) decoding. The final received data stream is delivered in a serial MPEG-2 transport format. All gain, clock, and carrier, acquisition and tracking loops are integrated in the QAM receiver.

The upstream transmitter takes burst or continuous data, provides FEC encoding and pre-equalization for DOCSIS applications, filters and applies 2/4/8/16/64/256 QAM or S-CDMA modulation to the data stream, amplifies the signal through the integrated upstream power amplifier and provides a direct 0–65 MHz analog output.

The MAC of the single chip DOCSIS/EuroDOCSIS CM includes all features required for full DOCSIS 1.0, 1.1, and 2.0 compliance, including full support for baseline privacy (BPI+) encryption and decryption. Single-user support includes four SIDS (Standard Interoperable Datalink System) in downstream, four DA perfect match filters, a 256 entry CAM for multicast/unicast hash filter and four independent upstream queues for simultaneous support of Quality of Service (QoS) and BE traffic. To enhance operational support, the MAC of the single chip DOCSIS/EuroDOCSIS CM provides extended Network Management MIB/Diagnostic features, as well as immediate UCC (on the fly) using independent resets for downstream and upstream queues and both individual queue reset/flush for upstream queues. The MAC of the single chip DOCSIS/EuroDOCSIS CM uses advance PROPANE™ techniques to provide packet acceleration to significantly improve upstream channel utilization.

With the incorporation of an upstream power amplifier, the MAC of the single chip DOCSIS/EuroDOCSIS CM allows a complete CM to be assembled with a minimal set of external components. When used with a CMOS tuner, such as the CMOS tuner of the other embodiment described above, a very low cost solution for a high performance, single user DOCSIS 2.0 CM is provided. The MAC of the single chip DOCSIS/EuroDOCSIS CM is operable to support all digital reference frequency locking functionality according to the invention. This figure shows yet another embodiment where all digital reference frequency locking functionality may be supported according to the invention.

Figure 13:
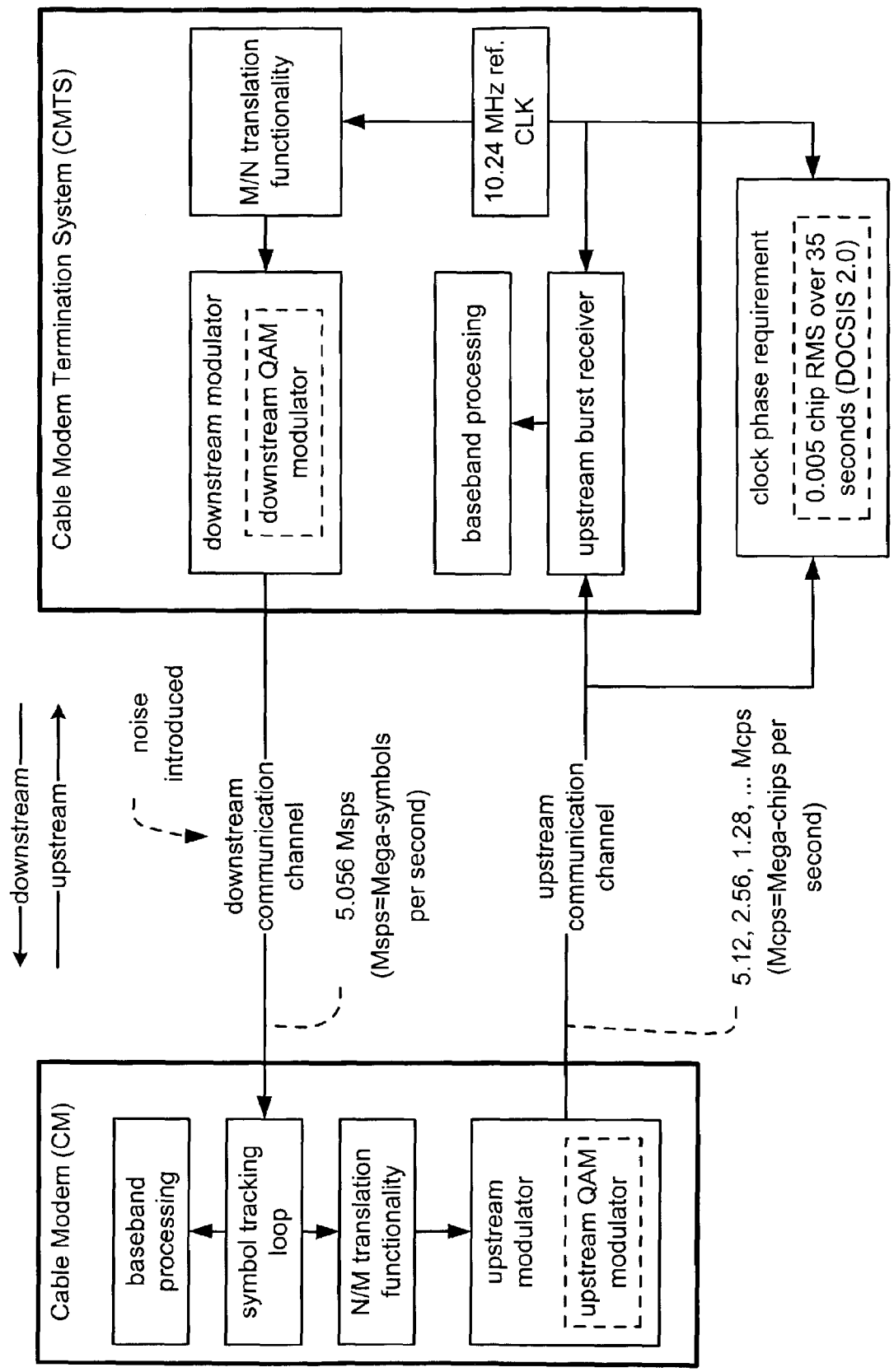
FIG. 13 is a system diagram illustrating another embodiment of a cable modem communication system that is built according to the invention.

FIG. 13 is a system diagram illustrating another embodiment of a cable modem communication system that is built according to the invention. The cable modem communication system within this figure shows how the symbol rate of the downstream communication (from the CMTS to the CM) is performed at a symbol rate of approximately 5.056 Msps (Mega-symbols per second). In more precise cable modem communication systems, the downstream symbol rate is substantially 5.056941 Msps. In addition, the upstream carrier frequency is approximately 10.24 MHz. In terms of Mcps (Mega-chips per second), the upstream chip rate (from the CM to the CMTS) is performed at rates that are integer multiples of 1.28 Mcps (e.g., 1.28 Mcps, 2.56 Mcps, 5.12 Mcps, etc.).

Within the downstream communication channel (from the CMTS to the CM), noise is oftentimes undesirably introduced. In order to recovery the downstream symbol rate of the signal received by the CM, the CM employs a symbol tracking loop. The received symbols within the downstream signal are themselves converted down to baseband and processed within the baseband processing functional block within the CM. The output of the symbol tracking loop will by very close to the 5.056 Msps rate of the received signal. This 5.056 value, which may be represented as a Frequency Control Word (FCW) in some embodiments employed a Numerically Controlled Oscillator (NCO), is provided to an N/M translation functional block. The N/M translation functional block takes the 5.056 value, appropriately scales it, and then uses this to lock the upstream to the expected 10.24 value. For example, if the downstream symbol frequency ($F_{BD}$) is extracted and found to be approximately 5.056 Msps, then appropriately chosen values for M,N (which may be programmable in certain embodiments) may be used to scale that received frequency for generation of the upstream clock so that the downstream and upstream may be locked. In this example, the ratio of N/M is shown as follows:

$$\frac{10.24}{5.056941} \approx \frac{10.24}{5.056} = \frac{N}{M}$$

In short, the multiplication of the received symbol frequency of the signal received by the CM (or a FCW representative of the received symbol frequency) is scaled to generate a frequency of 10.24 MHz (or a FCW representative of that frequency).

After the appropriate scaling has been performed within the N/M translation functional block, then the appropriate scaled frequency (or scaled FCW for use in NCO embodiments) is provided to the upstream modulator within the CM. The upstream modulator may be a QAM modulator in some embodiments. This value will then be used to control the upstream transmission from the CM to the CMTS.

If desired in certain embodiments, the reverse operation of N/M translation performed in the CM may be performed via M/N translation within the CMTS. For example, a local oscillator within the CMTS provides a very clean 10.24 reference MHz clock signal for use within the CMTS. The CMTS may then use this 10.24 reference MHz clock signal, and then perform M/N translation, as shown within the M/N translation functional block, to generate the approximate 5.056 Msps downstream signal within a downstream modulator (which may be implemented as a downstream QAM modulator in some embodiments).

The invention, by implementing its all digital reference frequency locking functionality, in one or both of the CM and the CMTS, will ensure that the cable modem communication system operates in accordance with clock phase requirement of the system. In DOCSIS, draft 2.0, this clock phase requirement is to be less than 0.005 chip RMS (Root Mean Square) drift over 35 seconds. By using the very clean clock of the CMTS, namely the 10.24 MHz reference clock, this clock phase requirement may be met using the all digital reference frequency locking functionality according to the invention. This very clean 10.24 MHz reference clock may be used to generate the downstream signal, and then to generate the upstream signal there from as well. In addition, the reference frequency of the local oscillator of the CMTS (e.g., the 10.24 MHz) may be used to analyze the upstream symbol frequency to ensure that the clock phase requirement of DOCSIS is achieved.

In addition, an upstream transmitted signal is provided to an upstream burst receiver within the CMTS and is then converted down to baseband and processed within the baseband processing functional block of the CMTS. The upstream burst receiver may also employ this very clean signal provided by the very clean 10.24 reference MHz clock signal of the local oscillator of the CMTS.

Figure 14:
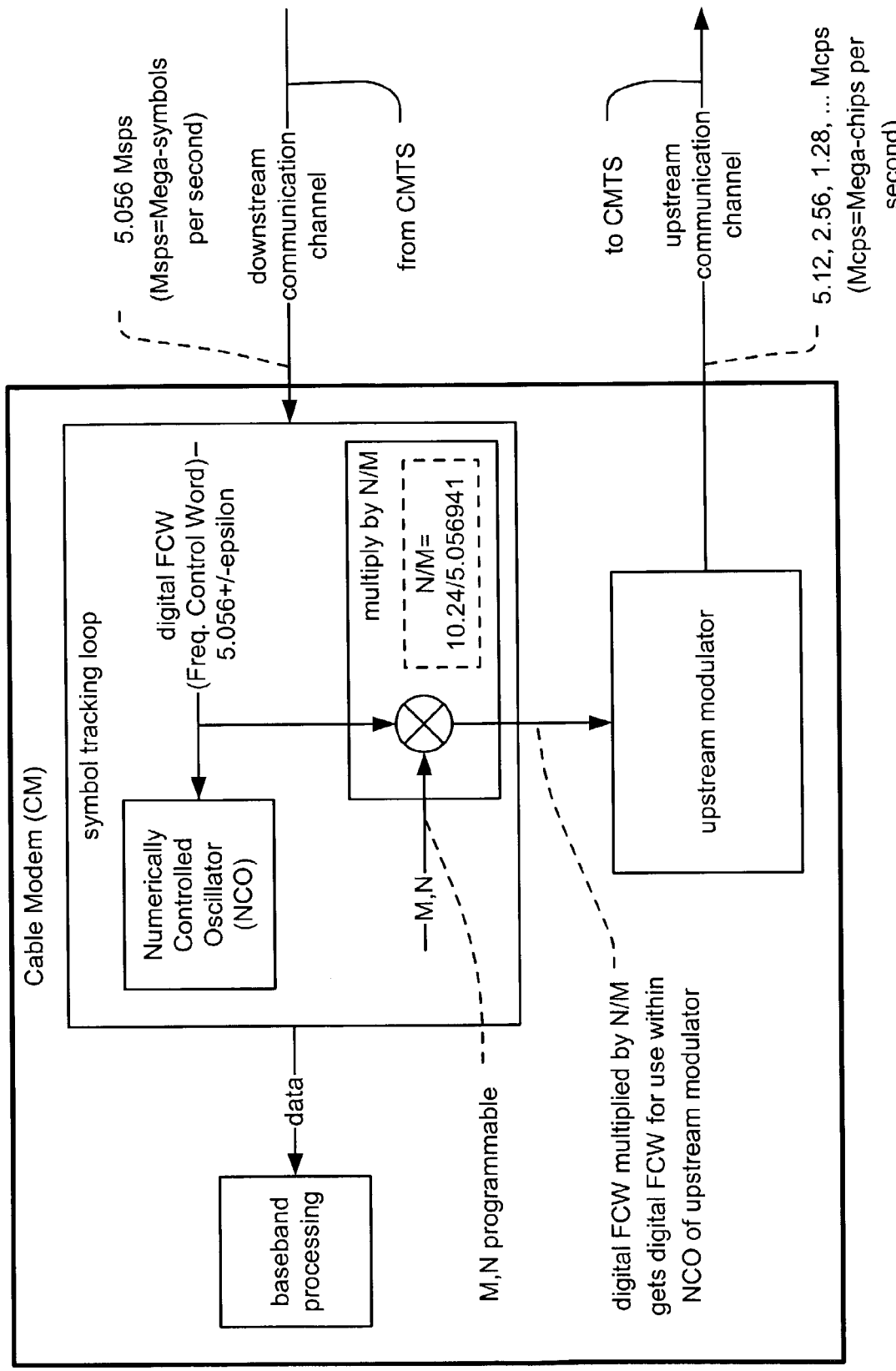
FIG. 14 is a diagram illustrating an embodiment of a Cable Modem (CM) that is built according to the invention.

FIG. 14 is a diagram illustrating an embodiment of a Cable Modem (CM) 1400 that is built according to the invention. This figure shows how a downstream signal received at the CM, transmitted from the CMTS, is initially provided to a symbol tracking loop. A digital Frequency Control Word (FCW) is generated from the received downstream signal. This digital FCW will correspond to a value of approximately 5.056+/− epsilon as it tracks. This value may then be provided to a Numerically Controlled Oscillator (NCO) for use within the CM. The data is then passed to a baseband processing functional block within the CM.

This estimated digital FCW is then passed to a multiply by N/M functional block. The particular values of M,N are programmable and may be 16 bit values in certain embodiments. The N/M functional block generates a scaled digital FCW for use within an upstream modulator. The appropriate scaling of the digital FCW will generate a digital FCW that is used for the upstream modulator. That is to say, the digital FCW is multiplied by N/M to get a new, scaled digital FCW for use within an NCO of the upstream modulator of the CM.

Figure 15:
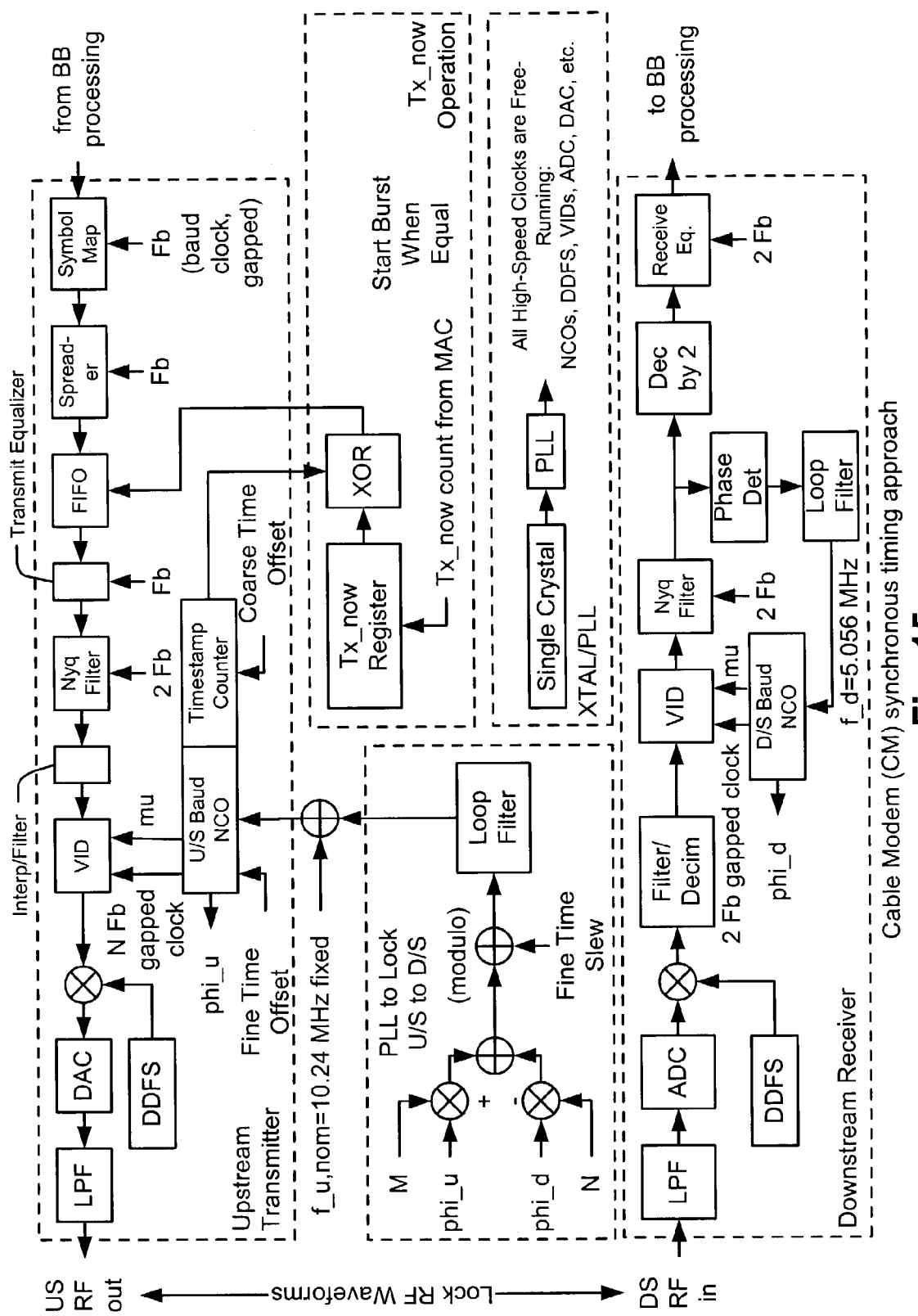
FIG. 15 is a diagram illustrating an embodiment of a Cable Modem (CM) synchronous timing approach according to the invention.

FIG. 15 is a diagram illustrating an embodiment of a Cable Modem (CM) synchronous timing approach according to the invention. This figure shows one embodiment of how the all-digital approach to lock the CM upstream symbol clock to the downstream symbol clock may be performed. For DOCSIS 2.0, the upstream timing is derived from the downstream symbol clock. Another requirement is that the upstream clock jitter must be considerably less than a nanosecond. The invention adds virtually zero jitter. This figure shows five separate blocks: Crystal (XTAL)/PLL, Upstream transmitter, Downstream receiver, PLL to lock upstream to downstream, and Tx_now operation.

Crystal (XTAL)/PLL (Phase Locked Loop): All clocks are derived from a single free-running crystal. Gapped clocks are generated by the VIDs (variable rate interpolator/decimator (VID)). Although the gapped clocks appear to have jitter, no jitter exists in the full digital representation including mu (fractional interpolant).

Downstream receiver: The downstream receiver locks its baud loop to the downstream symbol rate (5.056 MHz for Annex B 64-QAM). It generates phase samples phi_d in the downstream baud NCO that tracks the symbol timing. This phase (and delta phase) processing is described in more detail below.

Upstream transmitter: The upstream transmitter outputs a TDMA burst that must be correctly timed. The upstream baud NCO generates phase samples phi_u. It has additional MSBs (Most Significant Bits) that implement the timestamp counter. Fine and coarse adjustments are made to the counter during the ranging process.

PLL to lock upstream to downstream: The upstream and downstream symbol rates are defined in the ratio M/N (M=401 and N=812 for Annex B 64-QAM). A PLL adjusts the frequency of the upstream baud NCO such that the accumulated phases of the upstream and downstream NCOs, phi_u and phi_d, remain in this ratio. Appropriate modulo logic is used. Other implementations of this PLL are also possible. An offset may be added to the loop error signal to provide slewing of the timing in a smooth manner if needed in the fine ranging process.

Tx_now operation: The upstream baud NCO has additional MSBs that implement the timestamp counter. The MAC computes the timestamp count at which the TDMA burst should occur and loads it into the Tx_now register. When the timestamp counter reaches the value in the Tx_now register, the burst is started. Starting the burst means that the symbols which are queued in the FIFO (First In/First Out) start being clocked into the transmit equalizer at one sample per symbol. Before the burst begins, numerically zero symbols are clocked into the transmit equalizer. It is noted that the burst on/off control is done at one sample per symbol. The transmit amplifier is also muted before and after a burst.

Figure 16:
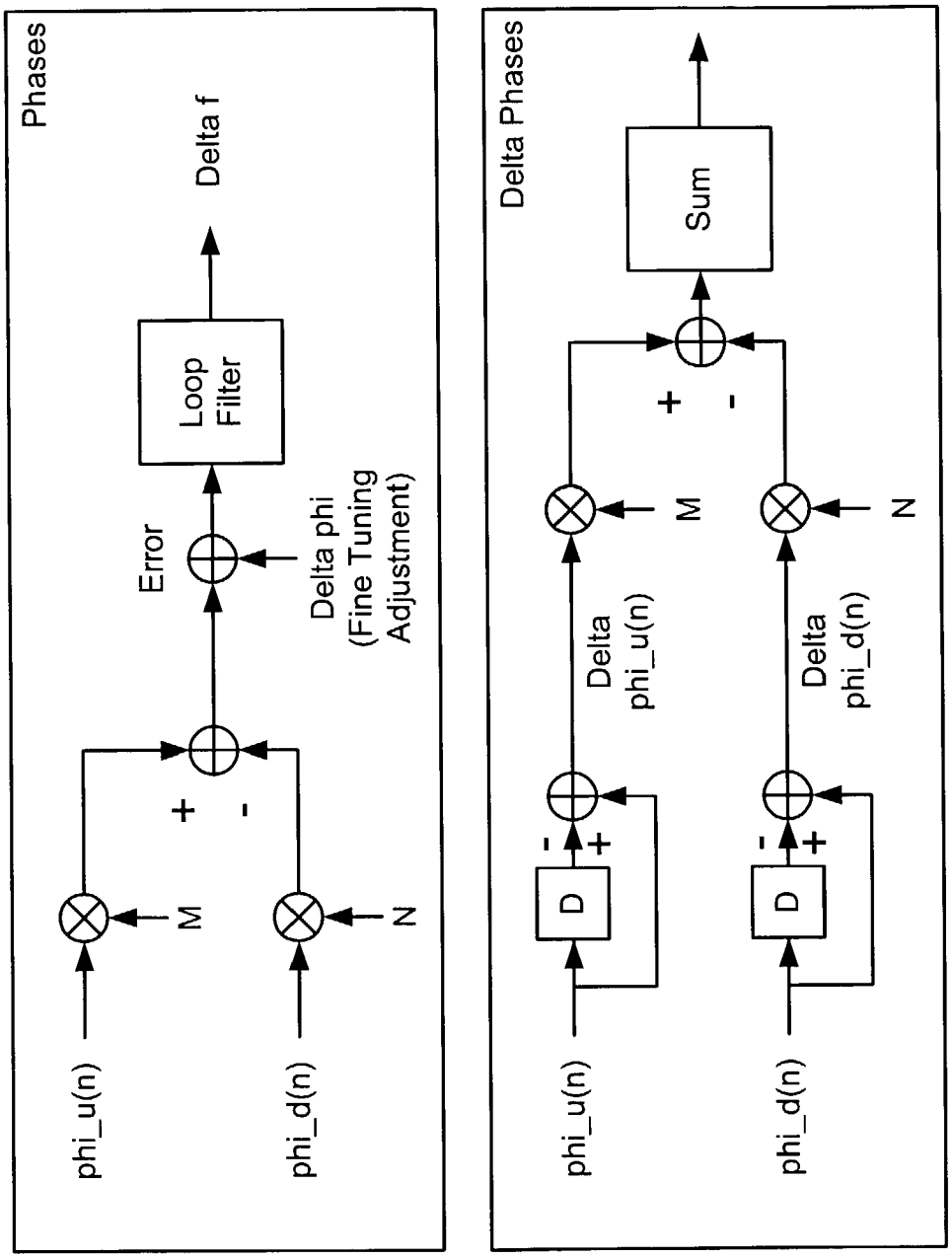
FIG. 16 is a processing diagram illustrating an embodiment of phases and delta phases processing according to the invention.

FIG. 16 is a processing diagram illustrating an embodiment of phases and delta phases processing according to the invention. This figure shows how phases and delta phases (small changes in the phases), while using fractional (M/N) PLLs. In determining the phases, the inputs phi_u(n) and phi_d(n) are extended over several cycles, corresponding to the phi of the upstream and the phi of the downstream. The factors M and N are used to scale the inputs phi_u(n) and phi_d(n). These scaled values are then summed together in modulo to permit a wide range. This error is then adjusted using delta phi (fine tuning adjustment), and is then put into a loop filter to generate a change in frequency, delta f.

The delta/change of the inputs phi_u(n) and phi_d(n) (shown as Delta phi_u(n) and Delta phi_d(n)) are derived as shown below in the delta phases block. The Delta phi_u(n) and Delta phi_d(n) are calculated by summing delayed versions of the inputs phi_u(n) and phi_d(n) with themselves. The factors M and N are also used to scale these deltas.

The following 3 embodiment describe various ways in which Cable Modem (CM) synchronous timing may be achieved according to the invention. Each of these figures shows a slightly different implementation that may be performed according to the invention. These variations are all described in further detail below.

These 3 embodiments shown some approaches to generate an upstream symbol clock that is synchronized to the downstream symbol clock are described. All of these implementations are fully digital in nature, with asynchronous (free running) sampling at the Analog to Digital Converter (ADC) and Digital to Analog Converter (DAC). Each of these embodiments employs five separate functional blocks: Crystal (XTAL)/PLL, Upstream transmitter, Downstream receiver, PLL to lock upstream to downstream, and Tx_now operation.

Crystal(XTAL)/PLL: All clocks are derived from a single free-running crystal. Gapped clocks are generated by the VIDs (variable rate interpolator/decimator (VID)). Although the gapped clocks appear to have jitter, no jitter exists in the full digital representation including mu (fractional interpolant).

Downstream receiver: The downstream receiver locks its baud loop to the downstream symbol rate (5.056 MHz for Annex B 64-QAM). The downstream NCO generates the CLK_ds (downstream baud clock).

Upstream transmitter: The upstream transmitter outputs a TDMA burst that must be correctly timed. The upstream NCO generates the upstream baud clock 'CLK_us'. It has additional MSBs that implement the timestamp counter. Fine and coarse adjustments are made to the counter during the ranging process.

PLL to lock upstream to downstream: The upstream and downstream symbol rates are defined in the ratio M/N (M=401 and N=812 for Annex B 64-QAM). A PLL adjusts the frequency of the upstream baud NCO such that the accumulated phases of the upstream and downstream NCOs, phi_u and phi_d, remain in this ratio. Appropriate modulo logic is used. Other implementations of this PLL are also possible. An offset may be added to the loop error signal to provide slewing of the timing in a smooth manner if needed in the fine ranging process.

Tx_now operation: The upstream baud NCO has additional MSBs that implement the timestamp counter. The MAC computes the timestamp count at that the TDMA burst should occur and loads it into the Tx_now register. When the timestamp counter reaches the value in the Tx_now register, the burst is started. Starting the burst means that the symbols that are queued in the FIFO start being clocked into the transmit equalizer at one sample per symbol. Before the burst begins, numerically zero symbols are clocked into the transmit equalizer. Note that the burst on/off control is done at one sample per symbol. The transmit amplifier is also muted before and after a burst.

Figure 17:
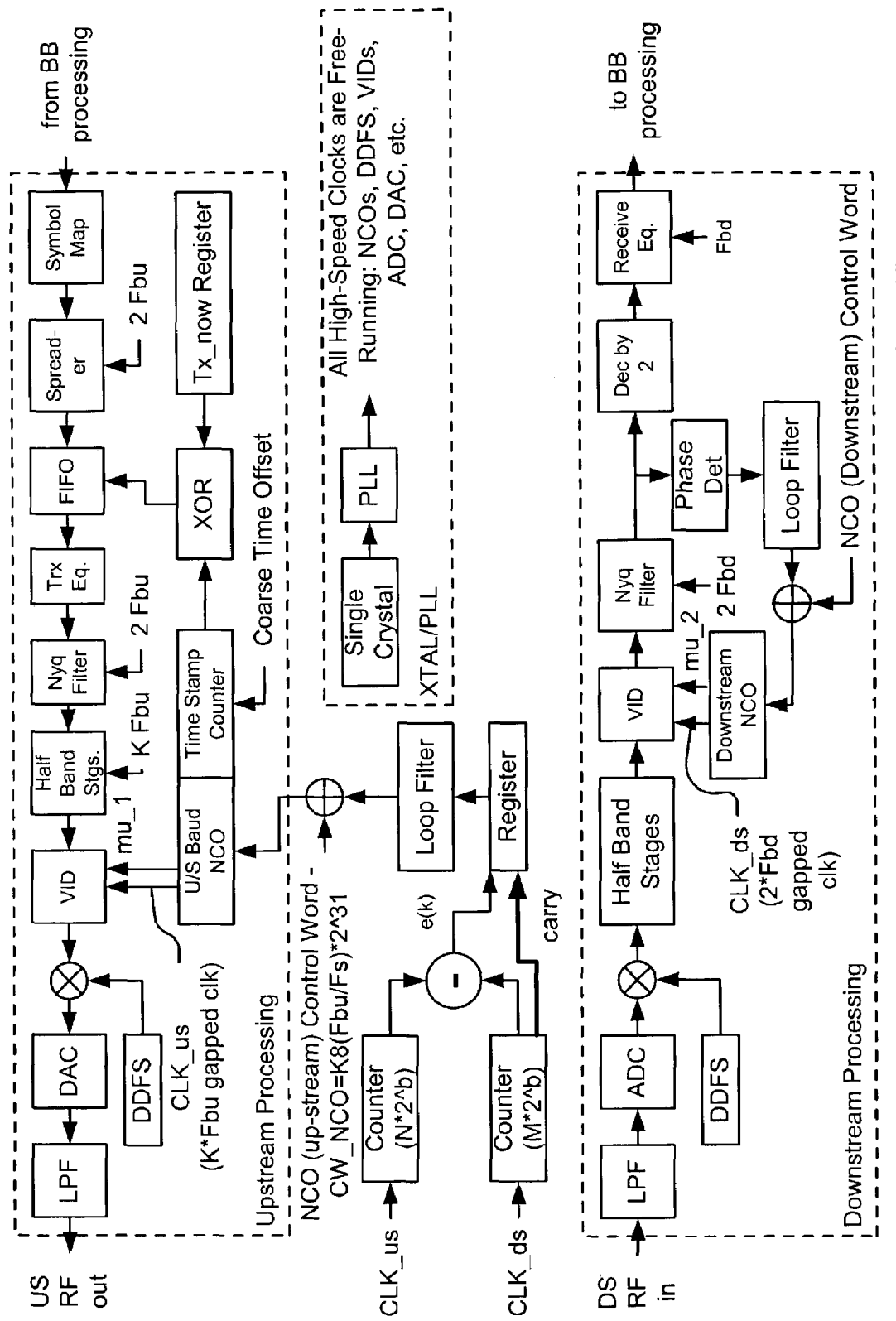
FIG. 17 is a diagram illustrating an embodiment of a Cable Modem (CM) synchronous timing approach, using counters for M,N, according to the invention.

FIG. 17 is a diagram illustrating an embodiment of a Cable Modem (CM) synchronous timing approach, using counters for M,N according to the invention. The upstream and downstream NCOs are locked together with a PLL (Phase Locked Loop). Similar to the notation used above, the Upstream Clock is shown as 'CLK_us,' and the Downstream Clock is shown as 'CLK_ds.' Both these clocks are gapped and can represent different baud rates. The ratio of the clocks (CLK_us/CLK_ds) is shown as a ratio (N/M).

Two counters are used to generate an error signal. The counters count down from fixed values of N and M. The Counter N is clocked by 'CLK_us' and resets when it reaches '0.' The Counter M is clocked by 'CLK_ds' and is reset when its count reaches '0.' The Count value of each counter is subtracted from one another and is sampled when the carry of Counter M is generated. Therefore and error sample 'e(k)' is obtained every M samples, of the Counter M. This error signal can be filtered by a loop filter and fed to the Upstream NCO. The PLL thus locks the upstream clock 'CLK_us' to the downstream clock 'CLK_ds.'

This implementation provides for a CM synchronous timing approach where no truncation of the N/M ratio is observed. In addition, the loop performance is dictated by the loop filter for the upstream that can be controlled independently from the downstream baud loop. There may be embodiments that do not afford a relatively long convergence time, and such embodiments may prefer variations to this embodiment that uses the counter M and N.

Figure 18:
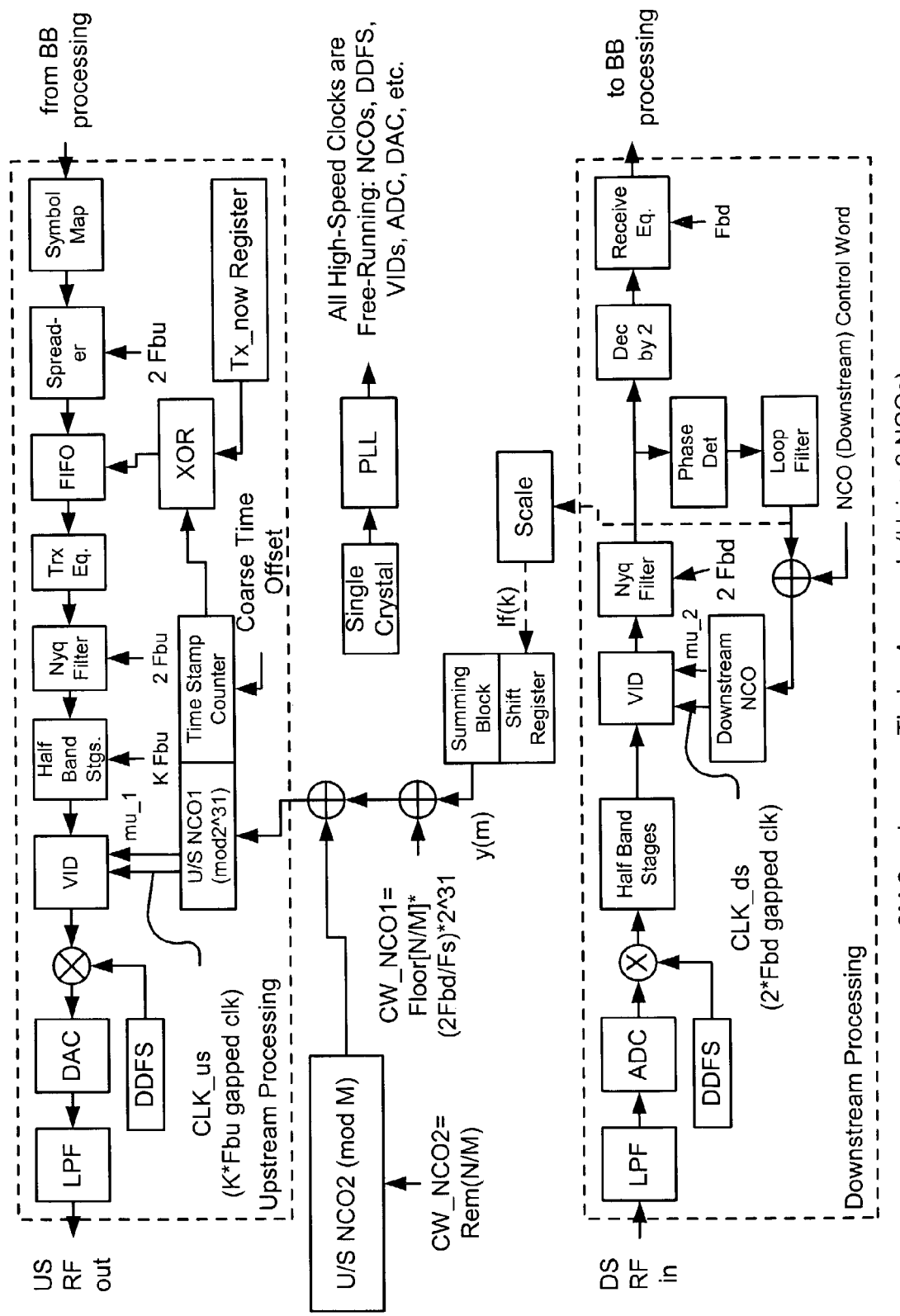
FIG. 18 is a diagram illustrating an embodiment of a Cable Modem (CM) synchronous timing approach, using 2 Numerically Controlled Oscillators (NCOs), according to the invention.

FIG. 18 is a diagram illustrating an embodiment of a Cable Modem (CM) synchronous timing approach, using 2 Numerically Controlled Oscillators (NCOs), according to the invention. This embodiment uses two separate NCOs for the upstream; 2 NCOs are employed to get a more accurate N/M computation. These NCOs are used to provide the N/M scaling in the particular baud rate that is required for the given application. An example is employed below to illustrate this issue. If there were only one NCO available the control word to this NCO would be as follows:

$$CW\_NCO=\mathrm{FLOOR}[N/M][(K*Fbd*2^{\wedge}31/Fs)],$$

where Fs is the NCO sampling frequency and Fbd is the downstream baud rate. K is the multiplication factor for the upstream baud rate generation, to take care of the up-sampled signals at the input to the VID. It is clear that the integer part of this control word (CW_NCO) would contain truncation errors due to the N/M multiplication factor.

The Frequency Control Word (FCW) can now be split into two separate FCWs for use with two separate NCOs, one NCO that deals with the integer part of the FCW (e.g., NCO1) and one NCO that deals with the fractional part of the FCW (e.g., NCO2).

The FCW for the NCO1: CW_NCO1=FLOOR [(K*Fbd*2^31)*(N/M)*(1/Fs)]

The FCW for the NCO2: CW_NCO2={[(K*Fbd*2^31)* (N/M)*(1/Fs)]−CW_NCO1}*2^31

Alternatively, the control words for the NCO1 and NCO2 may be defined as follows:

$$CW\_NCO1=\mathrm{FLOOR}[N/M][(K*Fbd*2^{\wedge}31/Fs)]$$

$$CW\_NCO2=REM[N/M]$$

Therefore NCO1 will accumulate on the integer part and NCO2 will accumulate the fractional part. When NCO2 overflows, an LSB is added to NCO1. It is thus seen that NCO2 keeps track of the residual error, which would have caused drift in the single NCO embodiment described above. It is also noted that this embodiment corrects for any drift periodically.

As an example, when N/M=812/401, CW_NCO1 will have FLOOR [N/M] as 2, and CW_NCO2 would have REM [N/M] as 10. NCO2 operates MOD [M], and wraps around when a count of M is reached. When NCO2 overflows, a Least Significant Bit (LSB) is added to the input of NCO1.

Apart from generating the control word, an error signal needs to be fed from the downstream baud loop, 'loop filter.' This error signal is added to the NCO control words to generate an upstream clock that is locked to N/M times the downstream clock. This error signal is smoothed out using a Moving Average block as described below.

Moving Average Block

The moving average block smoothes the output of the downstream loop filter before feeding the signal to the upstream loop filter. The moving average block consists of a shift register and a summing block. The shift register holds the last W samples of the downstream loop filter output. The summing block performs the following function $$y[m] = \left(\frac{1}{W}\right)\sum_{k=1}^{W} lf(k)$$

where y[m] is the output of the Moving average block, and lf(k) is a shift register that holds the last W samples of the downstream loop filter output. W can range between 1 to 128 to give increased smoothing to the loop.

This embodiment that employs two NCOs has a distinct advantage, in that, rapid lock time is achieved since the N/M computation is exact. There may be embodiments where the two NCOs implementation is non-ideal (e.g., insufficient device real estate, insufficient processing resources, economic considerations, etc.), and a designer may wish to employ other of the various embodiments described herein.

Another implementation parameter that may lead to another embodiment to support all digital reference frequency locking functionality according to the invention is the fact that after the final upstream clock is derived in this embodiment; it is not compared with the downstream clock to observe any error metric within this embodiment. The upstream baud loop relies entirely on the downstream baud loop loop-filter to produce an error signal for the upstream. There may be situations where the interface between the downstream baud loop and the upstream baud loop is such that the error signal variance might substantially affect the loop performance. That is to say, there may be embodiments where the loop filter for the upstream loop, by not being coupled from that of the downstream loop, may not produce any deleterious effects.

Figure 19:
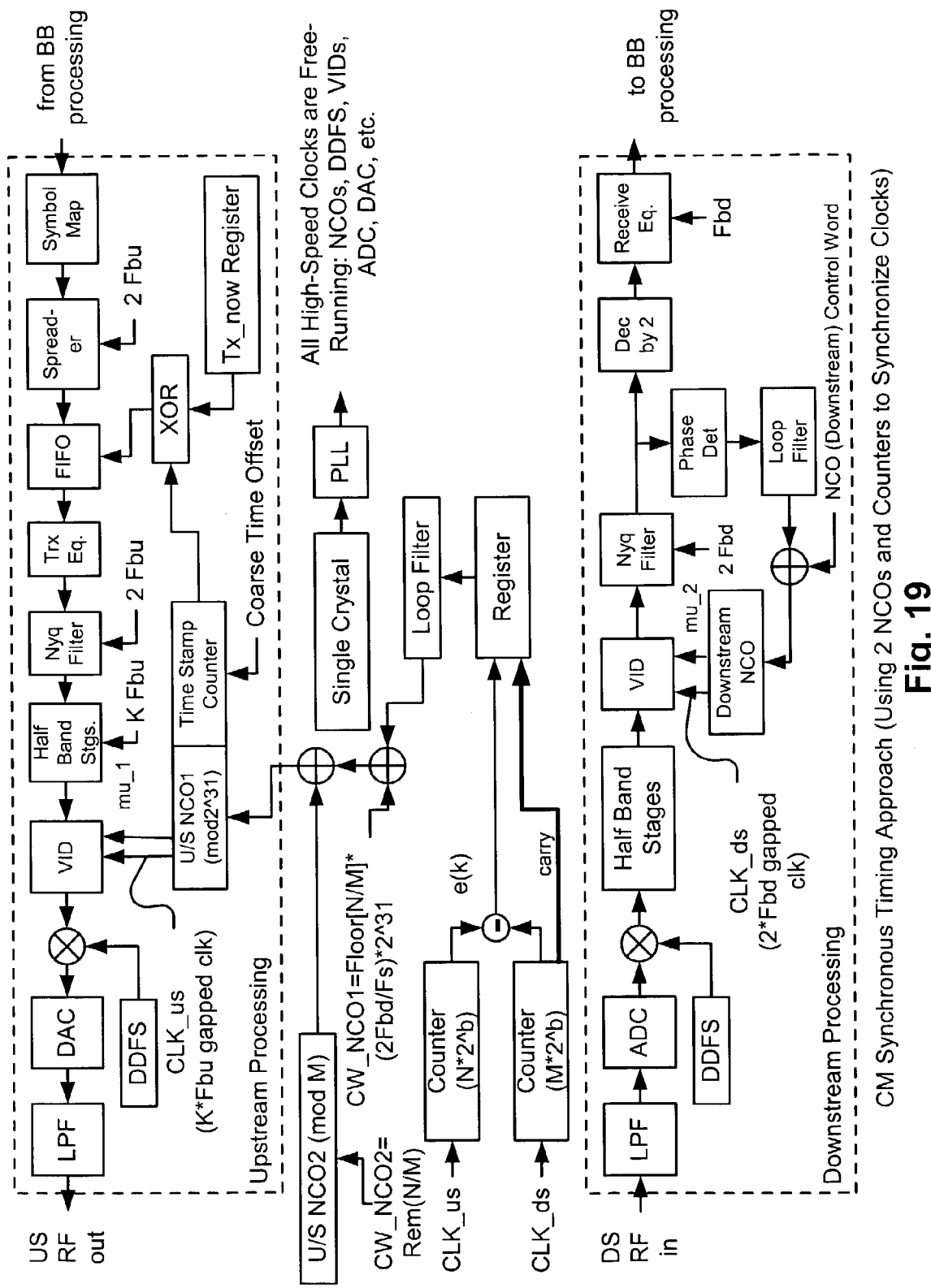
FIG. 19 is a diagram illustrating an embodiment of a Cable Modem (CM) synchronous timing approach, using 2 Numerically Controlled Oscillators (NCOs) and counters to synchronize clocks, according to the invention.

FIG. 19 is a diagram illustrating an embodiment of a Cable Modem (CM) synchronous timing approach, using 2 Numerically Controlled Oscillators (NCOs) and counters to synchronize clocks, according to the invention. This embodiment employs 2 NCOs to get an accurate N/M computation; in addition, 2 counters are used to synchronize the clocks.

Within the 2 NCO embodiment described above in the preceding figure, it is sometimes observed that the downstream baud loop filter is used to generate the error signal that allows the upstream baud loop to produce the proper upstream clock (CLK_us).

If it is determined that the upstream baud clock is to be compared with the downstream baud clock at regular intervals to produce an error signal, a combination of the embodiments of the preceding two figures may be used to provide even improved performance. This then does not require the loop filter from the downstream baud loop as an error signal.

Within this combination embodiment, it may be seen that the control words for NCO1 and NCO2 (upstream NCOs) are similar to the embodiment of the preceding figure. The difference in this combination embodiment is that 2 counters are used to produce an error signal that locks the upstream and the downstream baud clocks.

This combination embodiment also has a distinct advantage, in that rapid lock time is achieved since the N/M computation is exactly scaled by N/M and loaded. In addition, there is a comparison of upstream and downstream generated baud clocks to ensure that any deviation is corrected periodically.

This combination embodiment includes the benefits provide by employing 2 NCOs and 2 counters in an effort to synchronize the clocks for the upstream and downstream of the CM.

Figure 20:
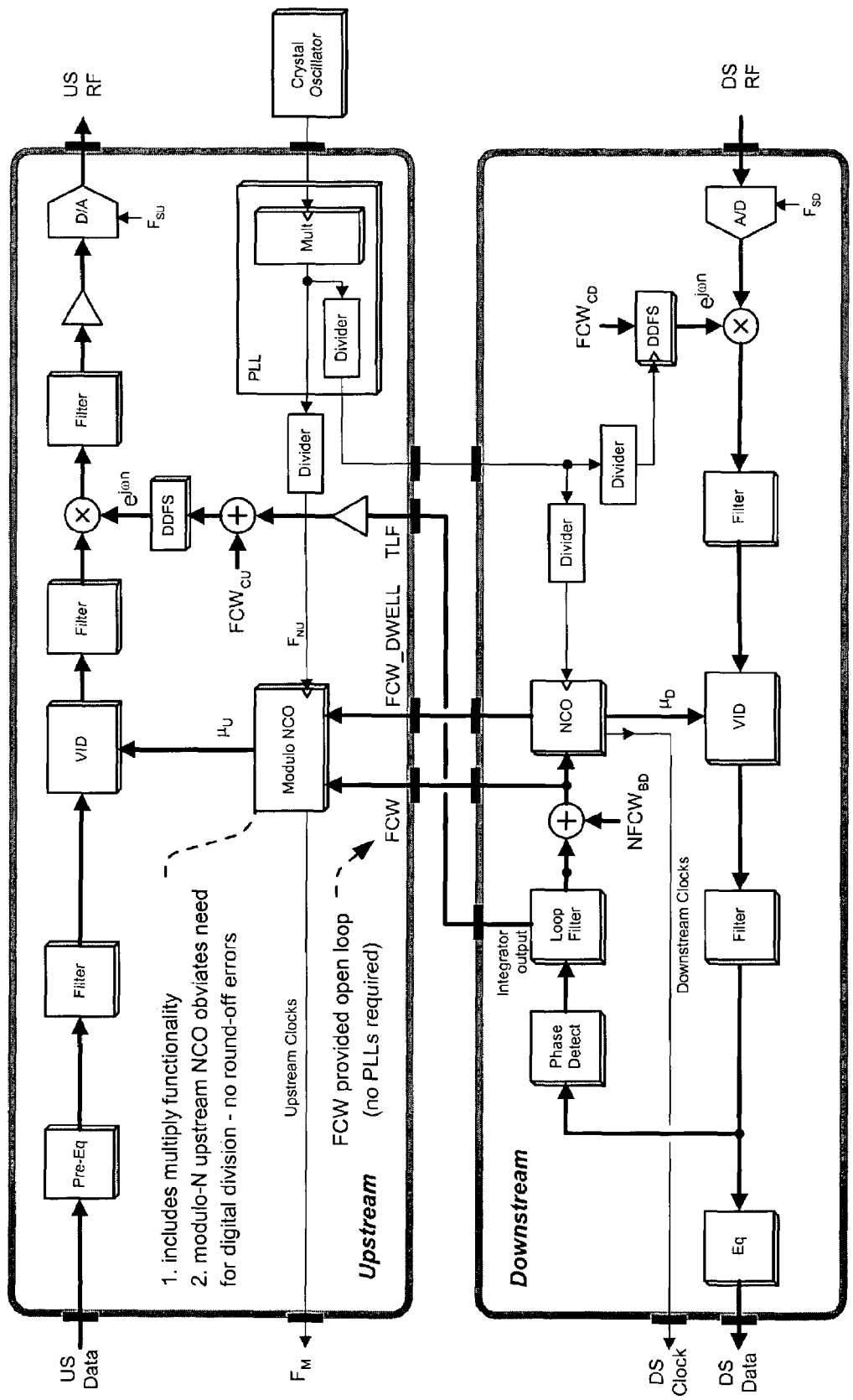
FIG. 20 is a diagram illustrating an embodiment of a synchronous Cable Modem (CM) physical layer (PHY) arranged according to the invention.

FIG. 20 is a diagram illustrating an embodiment of a synchronous Cable Modem (CM) physical layer (PHY) arranged according to the invention. A number of definitions and equations are employed to describe the functionality within this embodiment.

Upstream Definitions

| | |
|---|---|
| $F_M =$ | Reference Frequency (e.g., 10.24 MHz) |
| $DT_M =$ | Reference Clock Timing Adjustment |
| $F_{BU} =$ | Upstream Symbol Frequency |
| $F_{SU} =$ | Upstream Sampling Frequency |
| $F_{NU} =$ | Upstream Timing NCO Frequency |
| $FCW_{BU} =$ | Upstream Timing Frequency Control Word |
| $F_{CU} =$ | Upstream Carrier Frequency |
| $F_{PU} =$ | Upstream Carrier Phase Accumulator Frequency |
| $FCW_{CU} =$ | Upstream Carrier Frequency Control Word |

Downstream Definitions

| | |
|---|---|
| $F_{BD} =$ | Downstream Symbol Frequency |
| $F_{SD} =$ | Downstream Sampling Frequency |
| $F_{MD} =$ | Downstream Master Clock Frequency (from US PLL) |
| $F_{ND} =$ | Downstream Timing NCO Frequency |
| $NFCW_{BD} =$ | Downstream Nominal Timing Frequency Control Word (programmed) |
| $TLF_{BD} =$ | Downstream Timing Loop Filter Output |
| $FCW_{BD} =$ | Downstream Timing Frequency Control Word ($NFCW_{BD} + TLF_{BD}$) |
| $F_{CD} =$ | Downstream Carrier Frequency |
| $FCW_{CD} =$ | Downstream Carrier Frequency Control Word |

Constant Definitions
Timing Synchronization $$\frac{F_{BD}}{F_M} = \frac{M}{N}, (M, N \sim 16 \text{ bits})$$

$$\frac{F_{NU}}{F_{ND}} = L, (L \sim 5 \text{ bits})$$

$$\frac{F_{MD}}{2 \cdot F_{SD}} = K, (K = \{2, 3\} = > 2 \text{ bits})$$

Carrier Synchronization $$\frac{F_{CU}}{F_{PU}} = K_1 = FCW_{CU}$$

$$\frac{F_{PU}}{F_{ND}} = K_2$$

The locations of these variables defined above are also shown in their corresponding locations within this figure's embodiment. This embodiment employs a number of new hardware portions to provide for the all digital reference frequency locking functionality that is supported according to the invention.

In the downstream direction, a FCW driven NCO and divider may be added for mu generation. In addition, a counter may be added to compute number of NCO clocks per symbol clock. A sigma-delta modulator (SD modulator) may be added for timing loop filter output. Registers may be added to latch (1) loop filter output, (2) FCW, and (3) FCW dwell count. Moreover, in the upstream direction, a modulo-NCO may be added for direct conversion of the downstream FCW (by performing the appropriate scaling to generate the proper upstream frequency). A carrier lock circuit and a filter may also be added to the data path.

The operation of the technique of locking the upstream symbol clock phase to the downstream symbol clock phase in an all digital implementation may be described as follows:

The downstream section provides an appropriately scaled version of its NCO FCW (Frequency Control Word) that becomes the FCW of the upstream NCO. Thus, the upstream NCO tracks the phase of the downstream signal exactly. This scaling must be done with virtually no arithmetic errors (round-off, etc.), as any error would accumulate over time, causing the phase of the upstream to eventually diverge. The all digital implementation of the invention ensures that there is no error accumulation.

In order to have perfect arithmetic computations with no round-off, the upstream NCO is implemented as a modulo NCO as described below. That is, instead of rolling over at a power of 2, the modulo NCO rolls over at a specified integer value. This provides a perfect integer division of the frequency without the need for a digital divider, which would inherently produce round-off errors. The modulo NCO itself includes multiply functionality. In addition, the way in which the modulo NCO performs counting does not require any division; this helps to ensure that there is no error accumulation.

The functionality of upstream carrier lock processing, to assist in locking the upstream carrier frequency to the downstream symbol clock frequency, is also described in more detail below. It is also noted that the loop filter of the downstream symbol tracking loop (in the downstream portion) has its integrator output that is exported to the upstream block. The integrator contains an estimate of the downstream symbol clock. This value is scaled and applied to the upstream carrier frequency control word (FCW). Hence, the upstream carrier frequency is locked to the downstream symbol clock frequency borrowing upon the all digital implementation of the invention. This technique prevents offsets in the crystal oscillator of the CM from causing offsets in the upstream carrier frequency.

The operation of the CM in this embodiment may also be described as follows. As can be seen in the figure, the CM is partitioned into an upstream portion (e.g., an upstream transmitter) and a downstream portion (e.g., a downstream receiver). The upstream transmitter of the mc is operable to transmit data upstream to a Cable Modem Termination System (CMTS) via a cable modem network segment, and the downstream receiver is operable to receive data transmitted downstream by the CMTS via the cable modem network segment.

The upstream transmitter includes a physical interface that includes at least one modulo NCO that produces an upstream baud rate clock. As shown in other of the various embodiments, some embodiments employ two modulo NCOs. In some instances of those embodiments, the two modulo NCOs will receive two different FCWs, and one of the modulo NCOs will accumulate on an integer part of the upstream timing FCW, and the other modulo NCO will accumulate on a fractional part of the upstream timing FCW.

The downstream receiver includes a physical interface that includes a timing loop filter. The timing loop filter of the downstream receiver generates an estimate of a downstream symbol clock that corresponds to data transmitted downstream from the CMTS to the CM. The timing loop filter then generates a downstream timing FCW that corresponds to the estimate of the downstream symbol clock. The downstream receiver then scales the downstream timing FCW to generate an upstream timing FCW, and the modulo NCO receives the upstream timing FCW and generates the upstream baud rate clock using the upstream timing FCW.

In addition, the timing loop filter of the physical interface of the downstream receiver produces a downstream timing loop filter output, and the upstream timing FCW itself is generated by summing the downstream timing loop filter output and a downstream nominal timing FCW. The downstream nominal timing FCW is just one of several parameters that may be programmable in various embodiments. As will also be described below in some other embodiments, the modulo NCO of the upstream transmitter may be implemented to generate any one of integer multiples of the upstream baud rate clock. Moreover, the scaling of the downstream timing FCW may be performed by scaling the downstream timing FCW by a ratio whose numerator and denominator are generated using counters.

Another of the important aspects of the invention is shown within this figure as the FCW_dwell interface between the downstream portion and the upstream portion. Borrowing upon the functionality of the FCW_dwell interface, the upstream portion and the downstream portion may operate in two entirely independent clock domains.

The downstream portion sends a FCW to the upstream portion and modulo NCO within the upstream portion accumulates phase using the same number of times that the downstream NCO accumulates it. This will ensure that there is no error accumulation over time, similar to the manner described above in some of the other embodiments.

If these phases are not accumulated identically, then there would be errors that would build up over time, as the upstream portion would accumulate the number a different number of times than the downstream portion. These errors would cause a random walk between the upstream and the downstream clock phases, and they would not be precisely locked.

To solve this problem across an asynchronous interface, the FCW and FCW_dwell are both sent together across the interface from the downstream portion to the upstream portion. The FCW provides the NCO the actual FCW to use when generating the actual frequency. Via the FCW_dwell interface, a FCW_dwell value (provided from the downstream portion to the upstream portion) directs the upstream portion how many times to accumulate it, or how many times to clock the NCO with that FCW applied to its input. In other words, the downstream portion provides a FCW_dwell value to the upstream portion via the FCW_dwell interface to direct the upstream portion how many times to clock the modulo NCO with the upstream timing FCW. This guarantees that the downstream and the upstream accumulate exactly the same values with no random effects resulting from the asynchronous clock handoff.

It is noted that this manner of synchronizing, ensuring the accumulation of two different results within two different portions of an all digital device having asynchronous handoff, may be extended to other devices as well. This aspect of the invention may be applied to ensure the accumulation of the same values within different clock domains. In this particular embodiment, it is shown in the context of an upstream portion and downstream portion of a CM. Clearly, this aspect may be extended to other devices having multiple portions as well without departing from the scope and spirit of the invention.

Figure 21:
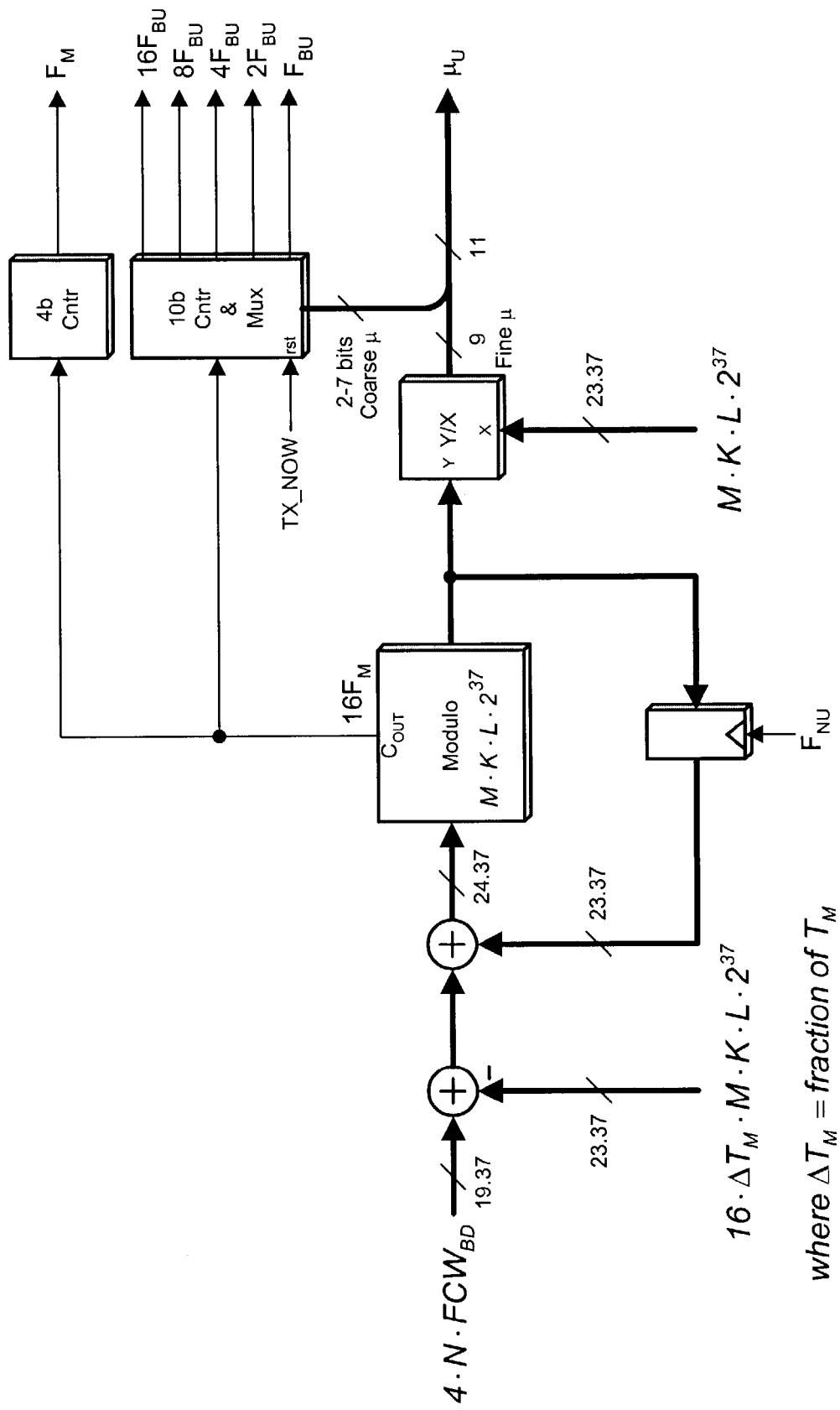
FIG. 21 is a diagram illustrating an embodiment of an upstream modulo-Numerically Controlled Oscillator (NCO) operated according to the invention.

FIG. 21 is a diagram illustrating an embodiment of an upstream modulo-Numerically Controlled Oscillator (NCO) operated according to the invention. A number of definitions and equations are employed to describe the functionality within this embodiment; they are provided below:

$$F_{BD} = \frac{FCW_{BD}}{(4 \cdot K) \cdot 2^Q} F_{ND}$$

$$F_M = \frac{N}{M} F_{BD} = \frac{N}{M} \frac{FCW_{BD}}{(4 \cdot K) \cdot 2^Q} F_{ND} = \frac{N}{M} \frac{FCW_{BD}}{(4 \cdot K) \cdot 2^Q} \frac{F_{NU}}{L}$$

$$F_M = \frac{N \cdot FCW_{BD}}{4 \cdot K \cdot M \cdot L \cdot 2^Q} F_{NU}$$

$$16 \cdot F_M = \frac{4 \cdot N \cdot FCW_{BD}}{K \cdot M \cdot L \cdot 2^Q} F_{NU} = \frac{N}{M} \cdot \frac{4 \cdot FCW_{BD}}{K \cdot L \cdot 2^Q}$$

Note: Q=37 in this illustrated embodiment.

Within this embodiment, it can be seen that the scaling of the FCW of the Downstream Timing Frequency Control Word (NFCW$_{BD}$+TLF$_{BD}$), FCW$_{BD}$, is performed by a scaled version of the ratio, $$\frac{N}{M},$$

and the remaining terms of $$\frac{4}{K \cdot L \cdot 2^Q}.$$

This scaled result is an integer multiple, (integer=16), of F$_M$=Reference Frequency (e.g., 10.24 MHz). Again, thanks to this implementation using a modulo NCO, part of the all digital implementation of the invention, no division need be performed thereby ensuring that there is no error accumulation when locking the upstream to the downstream.

This embodiment shows how a modulo NCO implementation may be used to generate any number of integer multiples of the Upstream Symbol Frequency (e.g., F$_{BU}$, 2F$_{BU}$, 4F$_{BU}$, 8F$_{BU}$, and 16F$_{BU}$), for the upstream communication. The upstream communication may be based on any one of these selected values to generate the 2–7 coarse bits that are used for μ$_U$.

FIG. 22 is a diagram illustrating an embodiment of an upstream modulo-Numerically Controlled Oscillator (NCO) look up table according to the invention. This figure illustrates a portion of the all digital reference frequency locking functionality, namely the relationship between the desired upstream symbol rate (in Msps) and the appropriately selected 2–7 coarse μ bits, and how they relate to the Reference Frequency=F$_M$ (e.g., 10.24 MHz), and also to the relationship of the integer multiples of the Upstream Symbol Frequency, F$_{BU}$ (e.g., 16F$_{BU}$, 8F$_{BU}$, 4F$_{BU}$, 2F$_{BU}$, and F$_{BU}$). In addition, a more detailed description of the upstream carrier lock processing is provided here.

Figure 23:
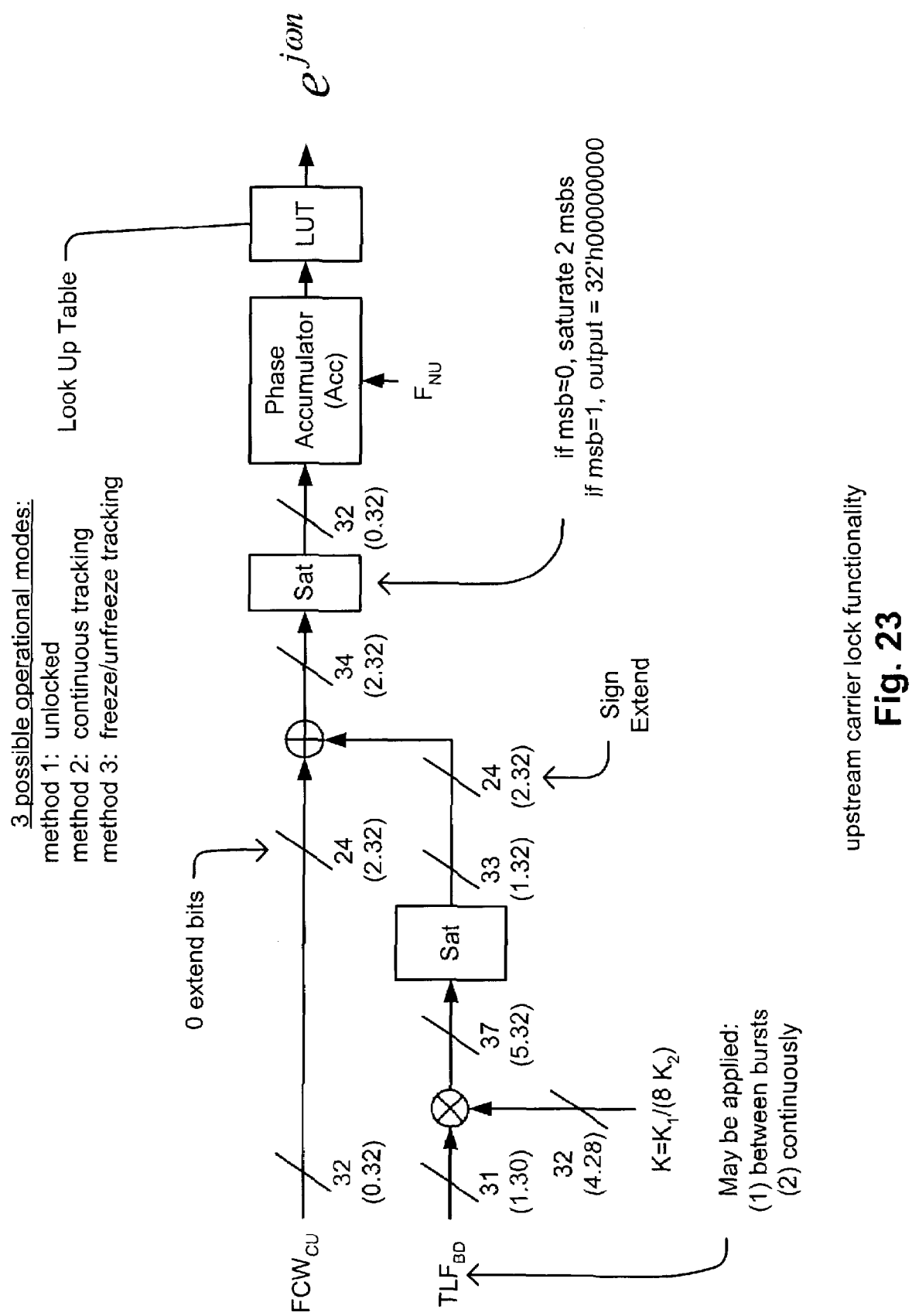
FIG. 23 is a diagram illustrating an embodiment of upstream carrier lock functionality supported according to the invention.

FIG. 23 is a diagram illustrating an embodiment of upstream carrier lock functionality supported according to the invention. This embodiment shows, in more detail, how the technique of locking the upstream carrier frequency to the downstream symbol clock frequency may be performed. The downstream clock FCW may be applied, after undergoing any appropriate scaling, to the upstream carrier FCW using any one of the 3 following operational modes:

Method 1: unlocked. The upstream carrier frequency is not locked to the downstream.

Method 2: Continuous tracking. The downstream clock control word is applied to the upstream carrier control word continuously. This resembles a normal tracking loop operation.

Method 3: Freeze/unfreeze tracking. In this mode, a new value of the downstream clock control word is applied to the upstream carrier frequency control word only when the upstream transmitter is turned off (e.g., between bursts in a TDMA system). When the upstream transmitter is active, the upstream carrier frequency control word is frozen at a constant value. This mode prevents tracking noise from coupling from the downstream clock tracking loop to the upstream signal. This is because the upstream clock is perturbed only when no transmission is taking place.

Figure 24:
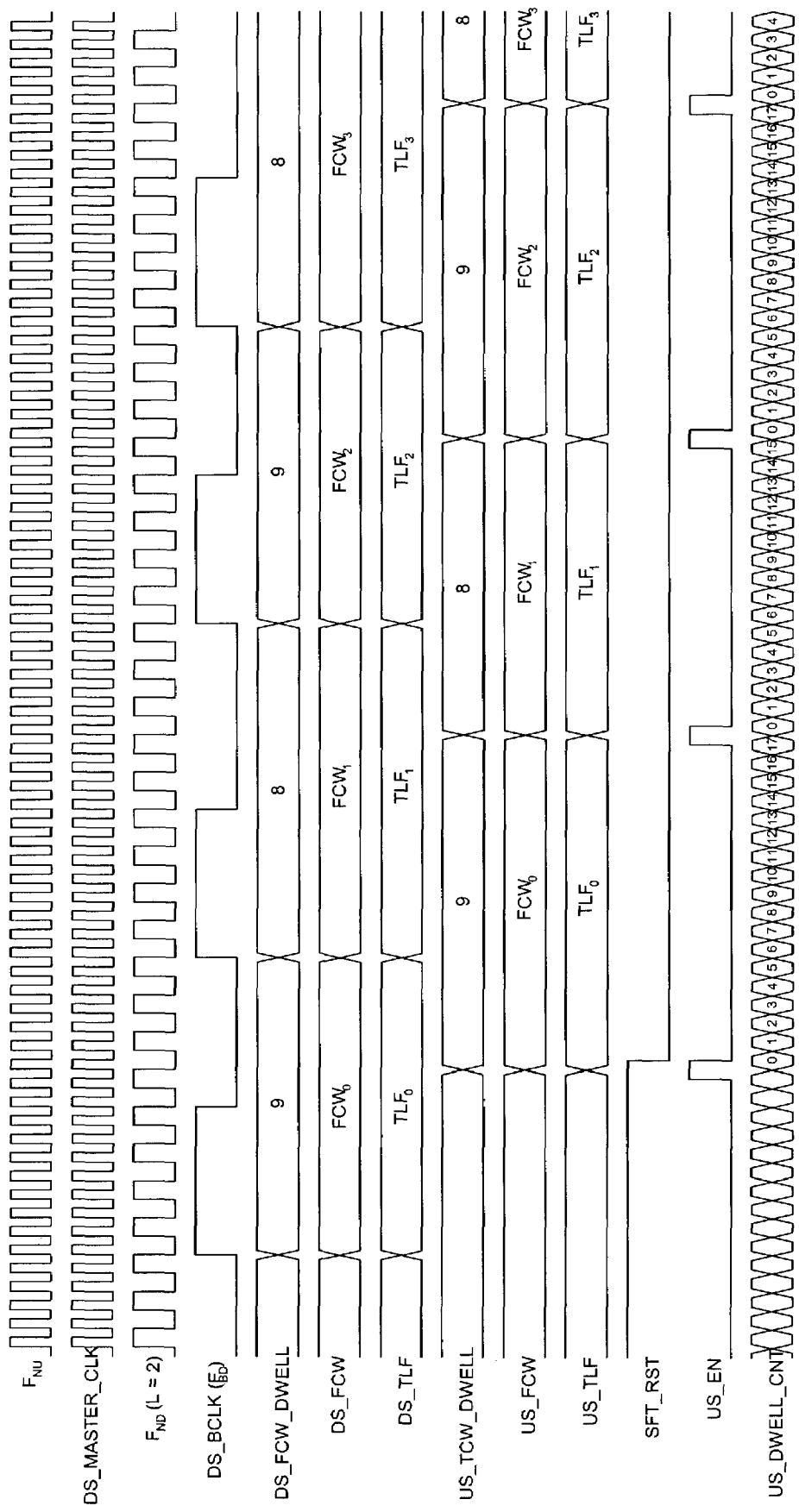
FIG. 24 is a timing diagram illustrating an embodiment of upstream interface signals according to the invention.

FIG. 24 is a timing diagram illustrating an embodiment of upstream interface signals according to the invention. The variables shown within this figure are described and defined above in the various embodiments.

Figure 25:
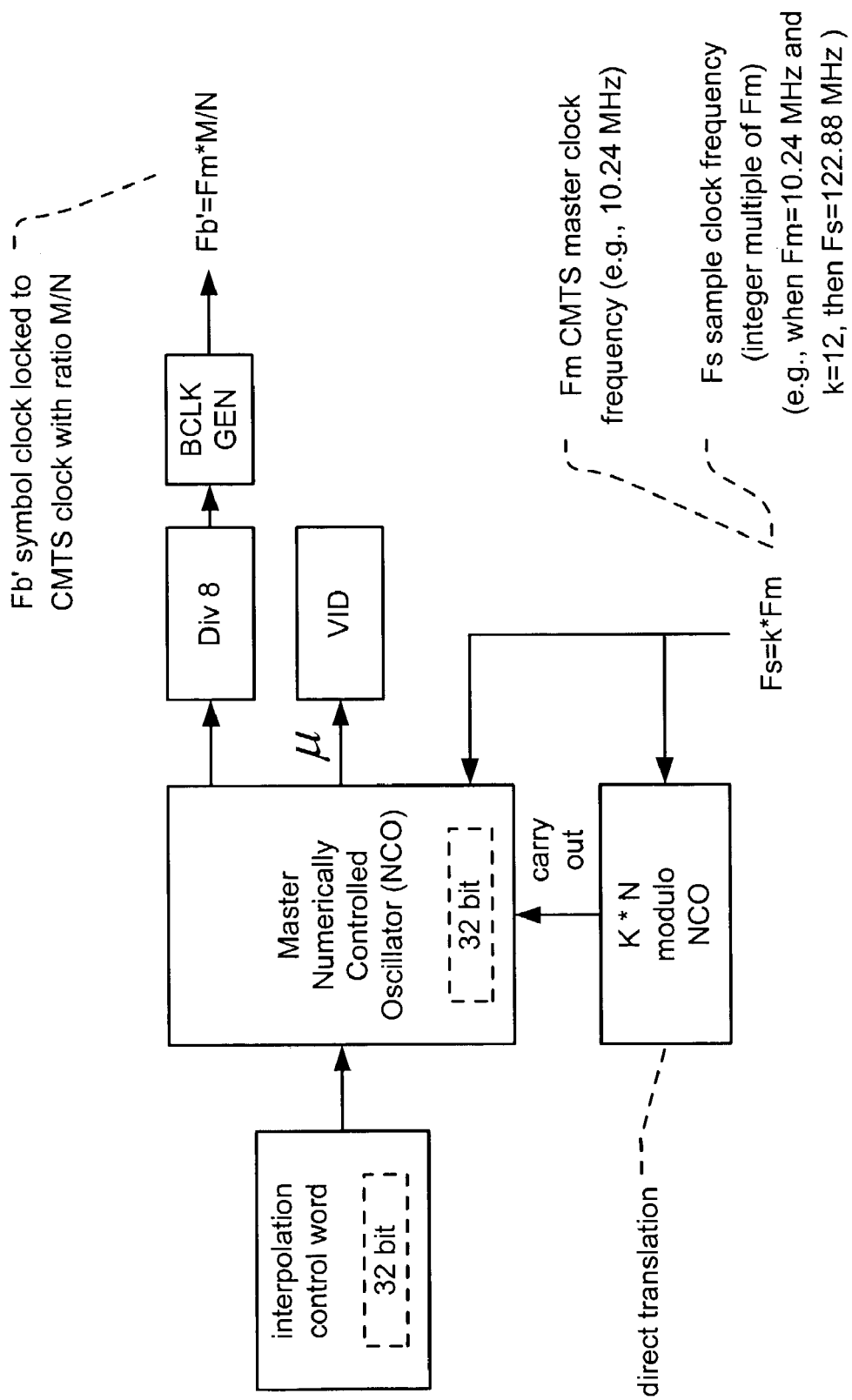
FIG. 25 is a diagram illustrating an embodiment of symbol clock synchronization according to the invention.

FIG. 25 is a diagram illustrating an embodiment of symbol clock synchronization according to the invention. The symbol clock is locked to the CMTS master clock. The operation within this embodiment may be viewed as being locking the downstream symbol clock phase to the cable headend's CMTS reference clock phase.

$$Fb' = Fm \frac{M}{N},$$

where M and N are unsigned integer values that may be represented in 16 bits. This all digital modulo NCO technique is used to lock the downstream symbol clock phase to the headend reference clock phase (e.g., typically 10.24 MHz) in a DOCSIS 2.0 compliant downstream transmitter; the DOCSIS 2.0 compliant downstream transmitter is operable to synchronize its symbol clock without the CMTS master clock through an all digital synthesizer according to the invention. That is to say, the symbol clock of the DOCSIS 2.0 compliant downstream transmitter is locked to the CMTS master clock using the all digital techniques of the invention. This is done through direct translation of the symbol rate (Fb) from an integer multiple of the CMTS master clock frequency (Fm, which is typically 10.24 MHz or an integer multiple thereof) implemented using a modulo-N counter inside the chip. By employing this modulo-N counter inside the chip, it obviates the need to perform any division when performing the scaling required to perform the direct translation.

The following are the basic equations to lock the downstream symbol clock phase to the headend's CMTS reference clock phase.

$$Fb'=Fm^*(M/N) \qquad \text{EQ (1)}$$

Per the DOCSIS 2.0 spec, Fb' is the symbol clock that is locked to the CMTS clock with ratio M/N. M and N may be represented by 16-bit unsigned integers. It is again noted here that the use of the modulo-N counter inside the chip obviates the need to perform division by the value of the denominator (N) when performing this scaling. This will help ensure no round off error and also ensure no accumulation of error when performing the scaling by this ration of M/N.

$$Fs=K^*Fm \qquad \text{EQ (2)}$$

Fs is the sample clock and is an integer multiple of the CMTS master clock, Fm. (K=12 in a typical system, and Fm=10.24 MHz, so that Fs=122.88 MHz).

The interpolation control word, INTCTL, is related to the sample clock and baud clock by the following equation:

$$INTCTL=(2^{\wedge}32)^*(8^*Fb)/Fs$$

Substitute Fb' from EQ (1) and Fs from EQ (2) into INTCTL equation.

$$INTCTL=(2^{\wedge}35)^*(Fm^*(M/N))/(K^*Fm)$$

The equation shown above may be simplified as follows:

$$INTCTL=(2^{\wedge}35)^*M/(K^*N)$$

Going one step further, the above equation may be represented with an integer part followed by fractional part as follows:

$$INTCTL = INT + (NUM/DEN)$$

In this representation, INT is the integer part of the frequency control word (FCW), and NUM/DEN is fraction part of the frequency control word (FCW). In this representation above of an integer portion and a fractional portion, the numerator is typically less than the denominator (e.g., NUM<DEN). NUM is the numerator, and DEN is the denominator.

The interpolation control word, INTCTL, may be represented by INT (e.g., INTCTL=INT). In one digital embodiment, the numerator, NUM, may be represented using a 22 bit value and may be programmed via opcode STDTNUM. In addition, the difference, or delta, between the denominator, DEN, and the numerator, NUM, may be represented using a 22 bit value and may be programmed via opcode STDTDEL (e.g., programmed with DEN−NUM).

Figure 26:
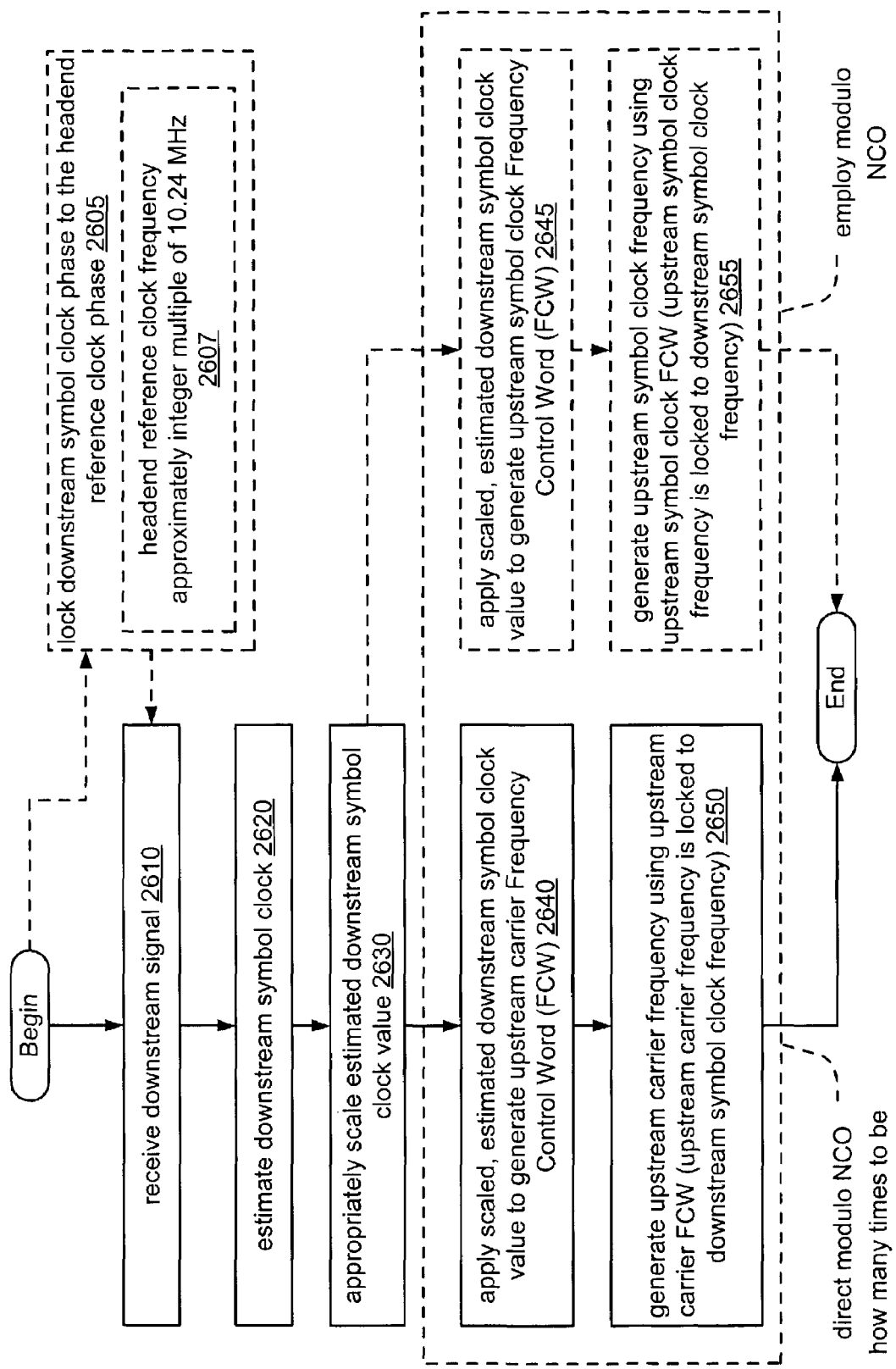
FIG. 26 is an operational flow diagram illustrating an embodiment of an all digital reference frequency locking method that is performed according to the invention.

FIG. 26 is an operational flow diagram illustrating an embodiment of an all digital reference frequency locking method that is performed according to the invention. As shown in a block 2610, a downstream signal is received. In some embodiments, as shown in a block 2605, the downstream symbol clock phase is locked to the headend reference clock phase. In addition, as shown in a block 2607, this headend reference clock frequency is typically approximately 10.24 MHz (or an integer multiple thereof).

In the cable modem communication system embodiment, this may be viewed as being a downstream signal provided from a CMTS to a CM. Afterwards, as shown in a block 2620, an estimate of the downstream symbol clock is made from the received downstream signal. In some embodiments, a loop filter of the downstream symbol tracking loop uses its integrator output as the exported value to an upstream block. This integrator contains an estimate of the downstream symbol clock (that is generated within the block 2620).

This downstream symbol clock value is appropriately scaled as shown in a block 2630. This will generate an appropriate FCW for use in the upstream portion of a communication system. This now appropriately scaled value is applied for use as the upstream carrier FCW as shown in a block 2640. Afterwards, an upstream carrier frequency is generated using the upstream FCW as shown in a block 2650. This upstream carrier frequency may be generated using a modulo NCO when the upstream FCW is provided thereto. Hence, the upstream carrier frequency is locked to the downstream symbol clock frequency.

In alternative embodiments, after the downstream symbol clock value is appropriately scaled as shown in a block 2630, the method may continue as follows: as shown in a block 2645, the scaled, estimated downstream symbol clock value may be applied to generate an upstream symbol clock FCW. Then, an upstream symbol clock frequency may be generated using the upstream symbol clock FCW as shown in a block 2655. This upstream symbol clock frequency may be generated using a modulo NCO when the upstream symbol clock FCW is provided thereto. Using this alternative embodiment, the upstream symbol clock frequency is locked to the downstream symbol clock frequency.

Figure 27:
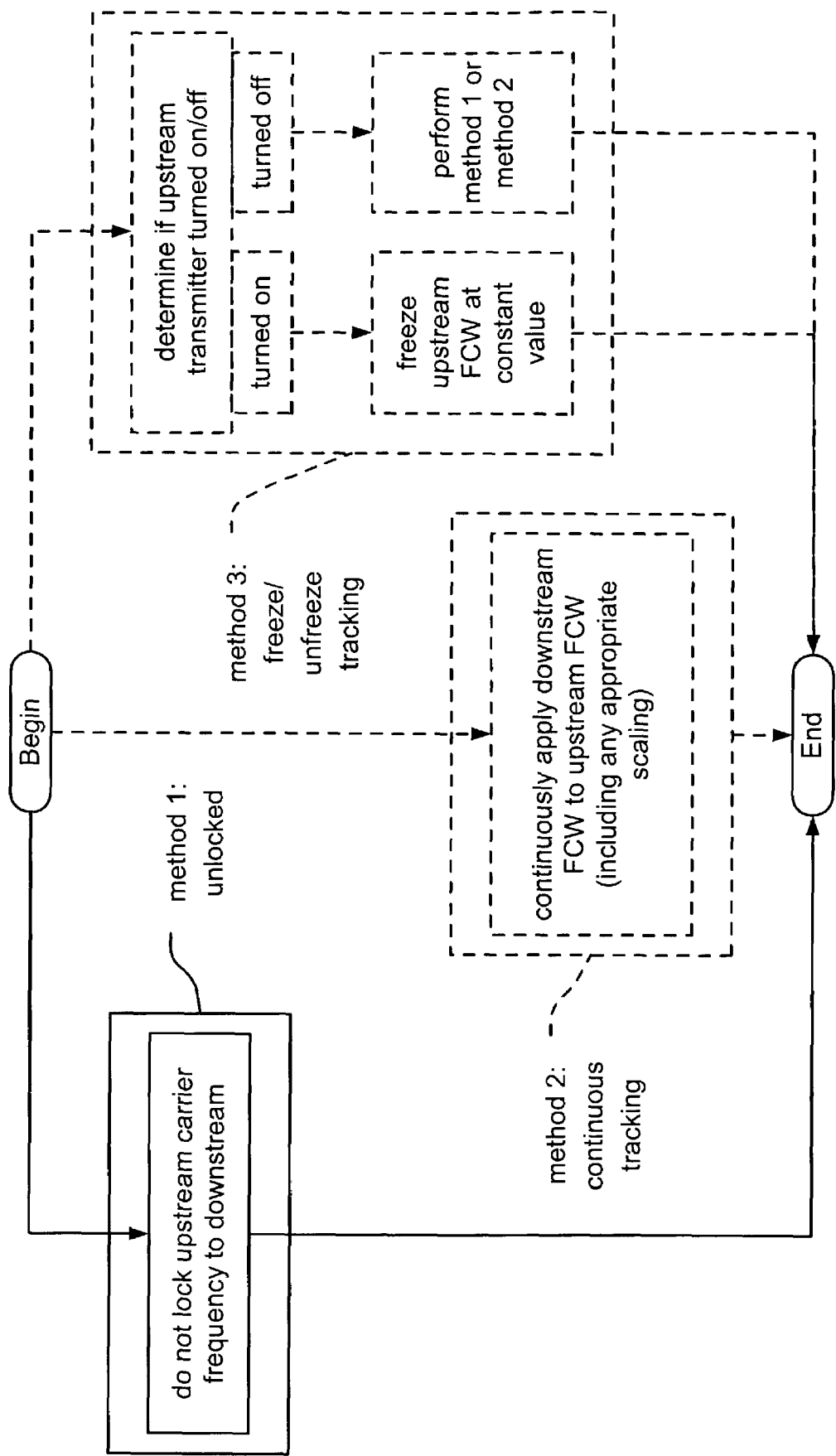
FIG. 27 is an operational flow diagram illustrating an embodiment of all digital reference frequency locking method tracking options that may be performed according to the invention.

FIG. 27 is an operational flow diagram illustrating an embodiment of all digital reference frequency locking method tracking options that may be performed according to the invention. There are 3 different approaches that may be performed to perform all digital reference frequency locking according to the invention.

Within a method 1, the all digital reference frequency locking method operates within an unlocked mode. The upstream carrier frequency is not locked to the downstream using this option.

Within a method 2, the all digital reference frequency locking method operates within a continuous tracking mode. The downstream clock control word (downstream FCW) is applied to the upstream carrier control word (upstream FCW) continuously; this also includes performing any necessary scaling of the downstream FCW before applying it to be used as the upstream FCW. This option resembles a normal tracking loop operation.

Within a method 3, the all digital reference frequency locking method operates within a freeze/unfreeze tracking mode. In this operational mode, a new value of the downstream clock control word (downstream FCW) is applied to the upstream carrier frequency control word (upstream FCW) only when the upstream transmitter is turned off. This may be the case when operating within a TDMA system. If and when the upstream transmitter is active, the upstream carrier frequency control word (upstream FCW) is frozen at a constant value. This mode prevents tracking noise from coupling from the downstream clock tracking loop to the upstream signal. This is because the upstream clock is perturbed only when no transmission is taking place. Alternatively, when the upstream transmitter is not active, the all digital reference frequency locking method may operate according to one of the other 2 operational modes (method 1 or method 2).

This all digital reference frequency locking method prevents offsets in a crystal oscillator of the downstream device (e.g., such as a CM in a cable modem communication system) from causing offsets in the upstream carrier frequency. In addition, modulo arithmetic may be employed to ensure that there is no error accumulation over time, as also described above in other of the various embodiments.

The invention provides a novel solution to lock two frequencies together using all digital techniques. This is divergent from the typical prior art approaches that use analog techniques to lock two frequencies together. Prior art approaches use a closed loop approach that employs PLLs. The all digital implementation/integration of the invention provides for a much lower parts count when compared to the prior art analog implementations.

Some embodiments of the invention (such as the embodiment of the FIG. 20) use an open-loop approach, without PLLs. The "open loop" approach refers to the fact that the information from the downstream NCO is copied directly into the upstream NCO (with any appropriate M/N scaling that is required) without requiring any feedback. Since a substantially exact integer arithmetic is used in the scaling, a closed loop approach is not needed. A closed loop approach would, however, be needed in alternate embodiments to remove errors that might build up as a result of imperfect arithmetic conversion of the FCW from the downstream portion to the upstream portion. The open loop approach has at least the following advantages: no acquisition sequence is needed (which is needed for a PLL to lock up); no acquisition hang-up problems will result (such as those as found within PLL embodiments); and there will be no added jitter such as that which may result from a PLL's response.

The invention ensures that much less circuit board noise will be coupled into other circuits within the system, when compared to prior art systems. A cleaner upstream signal (e.g., from the CM to the CMTS in a cable modem communication system embodiment) is achieved due to the freeze/unfreeze method and system provided according to the invention. The invention also provides a greater control of performance than within prior art approaches. It is also noted that the all digital functionality of locking an upstream transmission and a downstream symbol clock may be performed in reverse mode of operation (locking a downstream transmission and an upstream symbol clock) without departing from the scope and spirit of the invention.

The invention, in providing for supporting all digital reference frequency locking functionality between an upstream transmission and a downstream symbol clock, may also be supported in a variety of other devices as well. For example, the invention may be performed within a DOCSIS compliant 2.0 upstream burst receiver that is operable to support TDMA/S-CDMA. The DOCSIS compliant 2.0 upstream burst receiver is a fully integrated dual mode (A-TDMA/S-CDMA) n-QAM burst receiver that may accommodate a number of programmable formats ranging from BPSK (Binary Phase Shift Keying) to 256 QAM (Quadrature Amplitude Modulation). The DOCSIS compliant 2.0 upstream burst receiver may support variable modulation rates from 160 ksps (kilo-symbols per second) to 5.12 Msps (Mega-symbols per second) for up to 40.96 Mbps (Mega-bits per second) and operation within the 5–65 MHz upstream frequency range. A new Forward Error Correction (FEC) is employed to improve coding gain and impulse noise mitigation. Moreover, an integrated or external ADC may be employed to allow direct digital sampling capability, and a Fast Fourier Transform (FFT) processor may be implemented to for spectrum analysis as well as adaptive ingress cancellation.

Another device in which the invention may be practiced is DOCSIS 2.0 compliant downstream transmitter that also provides up to 1024 QAM modulation with a complete ITU-T J.83 Annex A/B/C plus 512/1024 QAM FEC encoding and a DAC. The DOCSIS 2.0 compliant downstream transmitter is operable to support 4/16/32/64/128/256/512/1024 QAM modulation, and also to support variable symbol rates (up to 12.5 Mbaud (Mega-baud)) with output sampling rates up to 200 MHz. The DOCSIS 2.0 compliant downstream transmitter may also employ a programmable excess Nyquist filter as well as a complex 24 tap T/2-spaced pre-distortion filter. The DOCSIS 2.0 compliant downstream transmitter is able to perform direct generation of IF spectrum up to 100 MHz. According to the invention, the DOCSIS 2.0 compliant downstream transmitter is operable to ensure that its symbol clock is locked to the CMTS master clock.

It is again noted that the single chip DOCSIS/EuroDOCSIS CMs described above, the DOCSIS compliant 2.0 upstream burst receiver, and the DOCSIS 2.0 compliant downstream transmitter, described in the context applications above, represent just some of the various embodiments in which the all digital reference frequency locking functionality of invention may be performed. Other embodiments of performing all digital locking of an upstream to a downstream symbol clock are also envisioned within the scope and spirit of the invention. Similarly, when desired, the invention is also operable to perform all digital locking of a downstream to an upstream symbol clock in such implementations where the upstream symbol clock is the reference. The all digital reference frequency locking provided by the invention may be implemented across a wide variety of applications.

While various embodiments have been described showing specific values for word widths, clock frequencies, and other specific operational parameters, it is understood that variations of such particular values of these parameters may be performed without departing from the scope and spirit of the invention.

As such and in view of the above detailed description of the invention and associated drawings, other modifications and variations will now become apparent. It should also be apparent that such other modifications and variations may be effected without departing from the spirit and scope of the invention.

What is claimed is:

1. A Cable Modem (CM), comprising:
an upstream transmitter that is operable to transmit data upstream to a Cable Modem Termination System (CMTS) via a cable modem network segment, the upstream transmitter having a physical interface that includes a modulo Numerically Controlled Oscillator (NCO) that produces an upstream baud rate clock;
a downstream receiver that is operable to receive data transmitted downstream by the CMTS via the cable modem network segment, the downstream receiver having a physical interface that includes a timing loop filter;
wherein the timing loop filter of the downstream receiver generates an estimate of a downstream symbol clock that corresponds to data transmitted downstream from the CMTS to the CM and, based thereupon, generates a downstream timing Frequency Control Word (FCW) that corresponds to the estimate of the downstream symbol clock;
wherein the downstream receiver scales the downstream timing FCW to generate an upstream timing FCW; and
wherein the modulo NCO receives the upstream timing FCW and generates the upstream baud rate clock based thereupon.

2. The CM of claim 1, wherein the timing loop filter of the physical interface of the downstream receiver produces a downstream timing loop filter output; and
the upstream timing FCW is generated by summing the downstream timing loop filter output and a downstream nominal timing FCW, the downstream nominal timing FCW being programmable.

3. The CM of claim 1, wherein the modulo NCO of the upstream transmitter generates a plurality of integer multiples of the upstream baud rate clock.

4. The CM of claim 1, wherein the scaling performed by the downstream receiver when scaling the downstream timing FCW to generate the upstream timing FCW comprises scaling the downstream timing FCW by a ratio of approximately 10.24 divided by approximately 5.056.

5. The CM of claim 1, wherein the scaling performed by the downstream receiver when scaling the downstream timing FCW to generate the upstream timing FCW comprises scaling the downstream timing FCW by a ratio; and
a numerator and a denominator of the ratio are generated using a plurality of counters.

6. The CM of claim 1, wherein the CM comprises the modulo NCO and at least one additional modulo NCO;
the upstream timing FCW is split into a first FCW and a second FCW;
the modulo NCO receives the first FCW;
the at least one additional modulo NCO receives the second FCW;
the modulo NCO accumulates on an integer part of the upstream timing FCW; and the at least one additional modulo NCO accumulates on a fractional part of the upstream timing FCW.

7. The CM of claim 1, wherein the upstream transmitter and the downstream receiver are communicatively coupled via a FCW_dwell interface; and via the FCW_dwell interface, the downstream receiver provides a FCW_dwell value to the upstream transmitter to direct the upstream transmitter how many times to clock the modulo NCO with the upstream timing FCW.

8. The CM of claim 1, wherein the upstream timing FCW is provided to the modulo NCO in an open loop approach.

9. The CM of claim 1, wherein the modulo NCO continuously receives the upstream timing FCW when the CM operates within a continuous tracking operational mode.

10. The CM of claim 1, wherein the upstream timing FCW is frozen at a constant value while the upstream transmitter is active when the CM operates within a freeze/unfreeze tracking operational mode.

11. The CM of claim 1, wherein the CMTS comprises a local oscillator having a reference frequency of approximately an integer multiple of 10.24 Mega-Hertz; and the reference frequency of the local oscillator of the CMTS is used to analyze the upstream baud rate clock.

12. The CM of claim 1, wherein a drift of the upstream baud rate clock comprises less than 0.005 chip RMS (Root Mean Square) drift over 35 seconds.

13. The CM of claim 1, wherein at least one of the data transmitted downstream by the CMTS and the data transmitted upstream by the CM comprises data that is modulated using Time Division Multiple Access (TDMA) modulation.

14. The CM of claim 1, wherein at least one of the data transmitted downstream by the CMTS and the data transmitted upstream by the CM comprises data that is modulated using Synchronous Code Division Multiple Access (S-CDMA) modulation.

15. The CM of claim 1, wherein the CM comprises a single chip Data Over Cable Service Interface Specifications (DOCSIS)/EuroDOCSIS Cable Modem (CM).

16. A Cable Modem (CM), comprising:

an upstream transmitter that is operable to transmit data upstream to a Cable Modem Termination System (CMTS) via a cable modem network segment, the upstream transmitter having a physical interface that includes a modulo Numerically Controlled Oscillator (NCO) that produces an upstream baud rate clock;

a downstream receiver that is operable to receive data transmitted downstream by the CMTS via the cable modem network segment, the downstream receiver having a physical interface that includes a timing loop filter;

wherein the timing loop filter of the downstream receiver generates an estimate of a downstream symbol clock that corresponds to data transmitted downstream from the CMTS to the CM and, based thereupon, generates a downstream timing Frequency Control Word (FCW) that corresponds to the estimate of the downstream symbol clock;

wherein the downstream receiver scales the downstream timing FCW to generate an upstream timing FCW;

wherein the modulo NCO receives the upstream timing FCW and generates the upstream baud rate clock based thereupon;

wherein the upstream transmitter and the downstream receiver are communicatively coupled via a FCW_dwell interface; and via the FCW_dwell interface, the downstream receiver provides a FCW_dwell value to the upstream transmitter to direct the upstream transmitter how many times to clock the modulo NCO with the upstream timing FCW.

17. The CM of claim 16, wherein the timing loop filter of the physical interface of the downstream receiver produces a downstream timing loop filter output; and the upstream timing FCW is generated by summing the downstream timing loop filter output and a downstream nominal timing FCW, the downstream nominal timing FCW being programmable.

18. The CM of claim 16, wherein the modulo NCO of the upstream transmitter generates a plurality of integer multiples of the upstream baud rate clock.

19. The CM of claim 16, wherein the scaling performed by the downstream receiver when scaling the downstream timing FCW to generate the upstream timing FCW comprises scaling the downstream timing FCW by a ratio of approximately 10.24 divided by approximately 5.056.

20. The CM of claim 16, wherein the scaling performed by the downstream receiver when scaling the downstream timing FCW to generate the upstream timing FCW comprises scaling the downstream timing FCW by a ratio; and a numerator and a denominator of the ratio are generated using a plurality of counters.

21. The CM of claim 16, wherein the CM comprises the modulo NCO and at least one additional modulo NCO;

the upstream timing FCW is split into a first FCW and a second FCW;

the modulo NCO receives the first FCW;

the at least one additional modulo NCO receives the second FCW;

the modulo NCO accumulates on an integer part of the upstream timing FCW; and the at least one additional modulo NCO accumulates on a fractional part of the upstream timing FCW.

22. The CM of claim 16, wherein the upstream timing FCW is provided to the modulo NCO in an open loop approach.

23. The CM of claim 16, wherein the modulo NCO continuously receives the upstream timing FCW when the CM operates within a continuous tracking operational mode.

24. The CM of claim 16, wherein the upstream timing FCW is frozen at a constant value while the upstream transmitter is active when the CM operates within a freeze/unfreeze tracking operational mode.

25. The CM of claim 16, wherein the CMTS comprises a local oscillator having a reference frequency of approximately an integer multiple of 10.24 Mega-Hertz; and the reference frequency of the local oscillator of the CMTS is used to analyze the upstream baud rate clock.

26. The CM of claim 16, wherein a drift of the upstream baud rate clock comprises less than 0.005 chip RMS (Root Mean Square) drift over 35 seconds.

27. The CM of claim 16, wherein at least one of the data transmitted downstream by the CMTS and the data transmitted upstream by the CM comprises data that is modulated using Time Division Multiple Access (TDMA) modulation.

28. The CM of claim 16, wherein at least one of the data transmitted downstream by the CMTS and the data transmitted upstream by the CM comprises data that is modulated using Synchronous Code Division Multiple Access (S-CDMA) modulation.

29. The CM of claim 16, wherein the CM comprises a single chip Data Over Cable Service Interface Specifications (DOCSIS)/EuroDOCSIS Cable Modem (CM).

30. A Cable Modem (CM), comprising:
- an upstream transmitter that is operable to transmit data upstream to a Cable Modem Termination System (CMTS) via a cable modem network segment, the upstream transmitter having a physical interface that includes a modulo Numerically Controlled Oscillator (NCO) that produces an upstream baud rate clock;
- a downstream receiver that is operable to receive data transmitted downstream by the CMTS via the cable modem network segment, the downstream receiver having a physical interface that includes a timing loop filter;
- wherein the timing loop filter of the downstream receiver generates an estimate of a downstream symbol clock that corresponds to data transmitted downstream from the CMTS to the CM and, based thereupon, generates a downstream timing Frequency Control Word (FCW) that corresponds to the estimate of the downstream symbol clock;
- wherein the downstream receiver scales the downstream timing FCW to generate an upstream timing FCW;
- wherein the modulo NCO receives the upstream timing FCW and generates the upstream baud rate clock based thereupon;
- wherein the upstream timing FCW is provided to the modulo NCO in an open loop approach;
- wherein the timing loop filter of the physical interface of the downstream receiver produces a downstream timing loop filter output; and
- wherein the upstream timing FCW is generated by summing the downstream timing loop filter output and a downstream nominal timing FCW, the downstream nominal timing FCW being programmable.

31. The CM of claim 30, wherein the modulo NCO of the upstream transmitter generates a plurality of integer multiples of the upstream baud rate clock.

32. The CM of claim 30, wherein the scaling performed by the downstream receiver when scaling the downstream timing FCW to generate the upstream timing FCW comprises scaling the downstream timing FCW by a ratio of approximately 10.24 divided by approximately 5.056.

33. The CM of claim 30, wherein the scaling performed by the downstream receiver when scaling the downstream timing FCW to generate the upstream timing FCW comprises scaling the downstream timing FCW by a ratio; and
- a numerator and a denominator of the ratio are generated using a plurality of counters.

34. The CM of claim 30, wherein the CM comprises the modulo NCO and at least one additional modulo NCO;
- the upstream timing FCW is split into a first FCW and a second FCW;
- the modulo NCO receives the first FCW;
- the at least one additional modulo NCO receives the second FCW;
- the modulo NCO accumulates on an integer part of the upstream timing FCW; and
- the at least one additional modulo NCO accumulates on a fractional part of the upstream timing FCW.

35. The CM of claim 30, wherein the upstream transmitter and the downstream receiver are communicatively coupled via a FCW_dwell interface; and
- via the FCW_dwell interface, the downstream receiver provides a FCW_dwell value to the upstream transmitter to direct the upstream transmitter how many times to clock the modulo NCO with the upstream timing FCW.

36. The CM of claim 30, wherein the CMTS comprises a local oscillator having a reference frequency of approximately an integer multiple of 10.24 Mega-Hertz; and
- the reference frequency of the local oscillator of the CMTS is used to analyze the upstream baud rate clock.

37. The CM of claim 30, wherein a drift of the upstream baud rate clock comprises less than 0.005 chip RMS (Root Mean Square) drift over 35 seconds.

38. The CM of claim 30, wherein at least one of the data transmitted downstream by the CMTS and the data transmitted upstream by the CM comprises data that is modulated using Time Division Multiple Access (TDMA) modulation.

39. The CM of claim 30, wherein at least one of the data transmitted downstream by the CMTS and the data transmitted upstream by the CM comprises data that is modulated using Synchronous Code Division Multiple Access (S-CDMA) modulation.

40. The CM of claim 30, wherein the CM comprises a single chip Data Over Cable Service Interface Specifications (DOCSIS)/EuroDOCSIS Cable Modem (CM).

41. A communication device, comprising:
- a transmitter portion that is operable to transmit data to at least one additional communication device;
- a modulo Numerically Controlled Oscillator (NCO);
- a receiver portion that is operable to receive data transmitted from the at least one additional communication device, the receiver portion comprising a timing loop filter;
- wherein the communication device is operable to support all digital reference frequency locking functionality that substantially locks a baud rate of a data transmission from the communication device to the at least one additional communication device to a symbol clock of data transmitted from the at least one additional communication device to the communication device;
- wherein the timing loop filter, of the receiver portion, generates an estimate of the symbol clock of data transmitted from the at least one additional communication device to the communication device and generates a timing Frequency Control Word (FCW) that corresponds to the estimate;
- wherein the receiver portion scales the timing FCW by a ratio that is represented using an integer part and a fractional part;
- wherein the timing FCW is provided to the modulo NCO;
- wherein the modulo NCO generates the baud rate of the data transmission from the communication device to the at least one additional communication device;
- wherein the transmitter portion and the receiver portion are communicatively coupled via a FCW_dwell interface; and
- wherein, via the FCW_dwell interface, the receiver portion provides a FCW_dwell value to the transmitter portion to direct the transmitter portion how many times to clock the modulo NCO with the timing FCW.

42. The communication device of claim 41, wherein the modulo NCO generates a plurality of integer multiples of the baud rate of the data transmission from the communication device to the at least one additional communication device.

43. The communication device of claim 41, wherein the timing FCW is provided to the modulo NCO in an open loop approach.

44. The communication device of claim 41, wherein the modulo NCO continuously receives the timing FCW when the communication device operates within a continuous tracking operational mode.

45. The communication device of claim 41, wherein the timing FCW is frozen at a constant value; and
the transmitter portion is active when the communication device operates within a freeze/unfreeze tracking operational mode.

46. The communication device of claim 41, wherein at least one of the data transmitted from the at least one additional communication device to the communication device and data transmitted from the communication device to the at least one additional communication device comprises data that is modulated using Time Division Multiple Access (TDMA) modulation.

47. The communication device of claim 41, wherein at least one of the data transmitted from the at least one additional communication device to the communication device and data transmitted from the communication device to the at least one additional communication device comprises data that is modulated using Synchronous Code Division Multiple Access (S-CDMA) modulation.

48. The communication device of claim 41, wherein the communication device comprises a Cable Modem (CM); and
the at least one additional communication device comprises a Cable Modem Termination System (CMTS).

49. The communication device of claim 41, wherein the communication device is implemented within at least one of a cable modem communication system, a satellite communication system, a High Definition Television (HDTV) communication system, a cellular communication system, a microwave communication system, and a point-to-point radio communication system.

50. A communication device, comprising:
a transmitter portion that is operable to transmit data to at least one additional communication device;
a first modulo Numerically Controlled Oscillator (NCO);
a second modulo NCO;
a receiver portion that is operable to receive data transmitted from the at least one additional communication device, the receiver portion comprising a timing loop filter;
wherein the communication device is operable to support all digital reference frequency locking functionality that substantially locks a baud rate of a data transmission from the communication device to the at least one additional communication device to a symbol clock of data transmitted from the at least one additional communication device to the communication device;
the timing loop filter, of the receiver portion, generates an estimate of the symbol clock of data transmitted from the at least one additional communication device to the communication device and generates a timing Frequency Control Word (FCW) that corresponds to the estimate;
the receiver portion scales the timing FCW by a ratio that is represented using an integer part and a fractional part, the receiver portion generates a first timing FCW and a second timing FCW;
the first timing FCW is provided to the first modulo NCO;
the second timing FCW is provided to the second modulo NCO; and
the first modulo NCO and the second modulo NCO operate cooperatively to generate the baud rate of the data transmission from the communication device to the at least one additional communication device.

51. The communication device of claim 50, wherein the first modulo NCO and the second modulo NCO operate cooperatively to generate a plurality of integer multiples of the baud rate of the data transmission from the communication device to the at least one additional communication device.

52. The communication device of claim 50, wherein the transmitter portion and the receiver portion are communicatively coupled via a FCW_dwell interface; and
via the FCW_dwell interface, the receiver portion provides a FCW_dwell value to the transmitter portion to direct the transmitter portion how many times to clock the at least one of the first modulo NCO with the first timing FCW and the second modulo NCO with the second timing FCW.

53. The communication device of claim 50, wherein the first timing FCW is provided to the first modulo NCO in an open loop approach; and
the second timing FCW is provided to the second modulo NCO in the open loop approach.

54. The communication device of claim 50, wherein the first modulo NCO continuously receives the first timing FCW when the communication device operates within a continuous tracking operational mode; and
the second modulo NCO continuously receives the second timing FCW when the communication device operates within the continuous tracking operational mode.

55. The communication device of claim 50, wherein the first timing FCW is frozen at a constant value;
the second timing FCW is frozen at a constant value; and
the transmitter portion is active when the communication device operates within a freeze/unfreeze tracking operational mode.

56. The communication device of claim 50, wherein at least one of the data transmitted from the at least one additional communication device to the communication device and data transmitted from the communication device to the at least one additional communication device comprises data that is modulated using Time Division Multiple Access (TDMA) modulation.

57. The communication device of claim 50, wherein at least one of the data transmitted from the at least one additional communication device to the communication device and data transmitted from the communication device to the at least one additional communication device comprises data that is modulated using Synchronous Code Division Multiple Access (S-CDMA) modulation.

58. The communication device of claim 50, wherein the communication device comprises a Cable Modem (CM); and
the at least one additional communication device comprises a Cable Modem Termination System (CMTS).

59. The communication device of claim 50, wherein the communication device is implemented within at least one of a cable modem communication system, a satellite communication system, a High Definition Television (HDTV) communication system, a cellular communication system, a microwave communication system, and a point-to-point radio communication system.

60. An all digital reference frequency locking method, the method comprising:
receiving a downstream signal;
estimating a downstream symbol clock frequency of the received downstream signal;
scaling the downstream symbol clock frequency estimate;
applying the scaled, downstream symbol clock frequency estimate to generate a frequency control word (FCW) corresponding to an upstream carrier frequency;

providing the FCW, corresponding to the upstream carrier frequency, to a modulo Numerically Controlled Oscillator (NCO);

generating the upstream carrier frequency using the modulo NCO;

directing how many times to clock the modulo NCO with the timing FCW;

wherein the upstream carrier frequency is locked to the downstream symbol clock frequency estimate of the received downstream signal.

61. The method of claim 60, further comprising locking a downstream symbol clock phase of the downstream signal to a headend reference clock phase.

62. The method of claim 61, wherein a frequency of the headend reference clock is approximately an integer multiple of 10.24 Mega-Hertz.

63. The method of claim 60, wherein the method is performed within a Cable Modem (CM); and the CM is implemented within a cable modem communication system.

64. The method of claim 60, wherein the method is performed within a communication device; and the communication device is implemented within at least one of a cable modem communication system, a satellite communication system, a High Definition Television (HDTV) communication system, a cellular communication system, a microwave communication system, and a point-to-point radio communication system.

65. An all digital reference frequency locking method, the method comprising:

receiving a downstream signal;

estimating a downstream symbol clock frequency of the received downstream signal;

scaling the downstream symbol clock frequency estimate;

applying the scaled, downstream symbol clock frequency estimate to generate a frequency control word (FCW) corresponding to an upstream symbol clock frequency;

providing the FCW, corresponding to the upstream symbol clock frequency, to a modulo Numerically Controlled Oscillator (NCO);

generating the upstream symbol clock frequency using the modulo NCO; and wherein the upstream symbol clock frequency is locked to the downstream symbol clock frequency estimate of the received downstream signal.

66. The method of claim 65, further comprising directing how many times to clock the modulo NCO with the FCW.

67. The method of claim 65, further comprising locking a downstream symbol clock phase of the downstream signal to a headend reference clock phase.

68. The method of claim 67, wherein a frequency of the headend reference clock is approximately an integer multiple of 10.24 Mega-Hertz.

69. The method of claim 65, wherein the method is performed within a Cable Modem (CM); and the CM is implemented within a cable modem communication system.

70. The method of claim 65, wherein the method is performed within a communication device; and the communication device is implemented within at least one of a cable modem communication system, a satellite communication system, a High Definition Television (HDTV) communication system, a cellular communication system, a microwave communication system, and a point-to-point radio communication system.

* * * * *